(12) United States Patent
You et al.

(10) Patent No.: US 10,425,196 B2
(45) Date of Patent: Sep. 24, 2019

(54) METHOD FOR TRANSMITTING AND RECEIVING DATA CHANNEL, AND LC DEVICE

(71) Applicant: LG ELECTRONICS INC., Seoul (KR)

(72) Inventors: Hyangsun You, Seoul (KR); Yunjung Yi, Seoul (KR); Suckchel Yang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,595

(22) PCT Filed: Mar. 23, 2016

(86) PCT No.: PCT/KR2016/002911
§ 371 (c)(1),
(2) Date: Oct. 18, 2017

(87) PCT Pub. No.: WO2016/171399
PCT Pub. Date: Oct. 27, 2016

(65) Prior Publication Data
US 2018/0159664 A1    Jun. 7, 2018

Related U.S. Application Data

(60) Provisional application No. 62/251,701, filed on Nov. 6, 2015, provisional application No. 62/244,720, filed on Oct. 21, 2015, provisional application No. 62/173,902, filed on Jun. 10, 2015, provisional application No. 62/158,575, filed on May 8, 2015, provisional application No. 62/154,757, filed on Apr. 30, 2015, provisional application No. 62/150,870, filed on Apr. 22, 2015.

(51) Int. Cl.
*H04L 1/18* (2006.01)
*H04L 27/26* (2006.01)
(Continued)

(52) U.S. Cl.
CPC .......... *H04L 1/1854* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS 9,749,117 B2    8/2017 Ko et al.
2012/0039256 A1    2/2012 Kwon et al.
(Continued)

FOREIGN PATENT DOCUMENTS

WO    2014109621    7/2014
WO    2015012665    1/2015
(Continued)

OTHER PUBLICATIONS

PCT International Application No. PCT/KR2016/002911, International Search Report dated Jul. 8, 2016, 5 pages.
(Continued)

*Primary Examiner* — Gregory B Sefcheck
*Assistant Examiner* — Jenkey Van
(74) *Attorney, Agent, or Firm* — Lee Hong Degerman Kang Waimey

(57) ABSTRACT

The disclosure of the present specification provides a method for receiving a physical downlink shared channel (PDSCH) in a low-capability (LC) or low-cost (LC) device. The method may comprise: a step for receiving repetition of a downlink control channel when coverage enhancement (CE) is set on the LC device; a step for determining multiple subframes to receive the repetition of the PDSCH on the basis of the reception of the repetition of the downlink control channel; a step for assessing whether or not a gap subframe exists among the multiple subframes; and a step for dropping the reception of the PDSCH on the gap subframe.

12 Claims, 41 Drawing Sheets

(51) Int. Cl.
*H04W 72/04* (2009.01)
*H04W 72/12* (2009.01)
*H04W 28/02* (2009.01)
*H04W 48/12* (2009.01)
*H04L 5/00* (2006.01)
*H04W 48/16* (2009.01)

(52) U.S. Cl.
CPC .......... *H04L 5/0069* (2013.01); *H04L 5/0082* (2013.01); *H04L 27/26* (2013.01); *H04W 28/0215* (2013.01); *H04W 48/12* (2013.01); *H04W 72/042* (2013.01); *H04W 72/0446* (2013.01); *H04W 72/1205* (2013.01); *H04W 72/1273* (2013.01); *H04L 5/001* (2013.01); *H04L 5/0091* (2013.01); *H04W 48/16* (2013.01)

(56) References Cited

U.S. PATENT DOCUMENTS

| | | |
|---|---|---|
| 2014/0098761 A1 | 4/2014 | Lee et al. |
| 2014/0362796 A1 | 12/2014 | Seo et al. |
| 2015/0029903 A1* | 1/2015 | Chen ................ H04W 72/0446 370/277 |
| 2015/0131579 A1* | 5/2015 | Li ............................ H04L 1/08 370/329 |
| 2015/0181576 A1* | 6/2015 | Papasakellariou .... H04L 5/0053 370/329 |
| 2015/0358998 A1 | 12/2015 | Golitschek Edler Von Elbwart et al. |
| 2017/0019911 A1* | 1/2017 | Rico Alvarino ......... H04B 3/36 |
| 2017/0141833 A1* | 5/2017 | Kim .................... H04B 7/0626 |

FOREIGN PATENT DOCUMENTS

| | | |
|---|---|---|
| WO | 2015046773 | 4/2015 |
| WO | 2015046830 | 4/2015 |

OTHER PUBLICATIONS

CATT, "Physical Channel Timing Relationships for Rel-13 Low Complexity UEs", 3GPP TSG RAN WG1 Meeting #80bis, R1-151339, Apr. 2015, 4 pages.
LG Electronics, "Discussion on Pusch transmissions for MTC", 3GPP TSG RAN WG1 Meeting #80bis, R1-151490, Apr. 2015, 7 pages.
LG Electronics, "PDSCH related issues for MTC", 3GPP TSG RAN WG1 Meeting #80bis, R1-151489, Apr. 2015, 3 pages.
3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.
3rd Generation Partnership Project (3GPP), "Technical Specification Group Radio Access Network; Evolved Universal Terrestrial Radio Access (E-UTRA); Multiplexing and channel coding (Release 10)," Section 5.3.3.1.1 of 3GPP TS 36.212 V10.2.0, Jun. 2011, 6 pages.
PCT International Application No. PCT/KR2016/002913, International Search Report dated Jul. 8, 2016, 3 pages.
Huawei et al., "PDSCH for MTC and coverage enhancement", 3GPP TSG RAN WG1 Meeting #80bis, R1-151859, Apr. 2015, 5 pages.
Japan Patent Office Application No. 2017-554477, Office Action dated Oct. 23, 2018, 3 pages.
European Patent Office Application Serial No. 16783334.2, Partial Search Report dated Oct. 23, 2018, 19 pages.
LG Electronics, "PDSCH transmission for MTC coverage enhancement", 3GPP TSG RAN WG1 Meeting #76, R1-140309, Feb. 2014, 5 pages.
Alcatel-Lucent, et al., "Coverage enhancement for RACH messages", 3GPP TSG RAN WG1 Meeting #76, R1-140153, Feb. 2014, 5 pages.
LG Electronics, "UL channel transmission for MTC coverage enhancement", 3GPP TSG RAN WG1 Meeting #76, R1-140308, Feb. 2014, 5 pages.
Intel, "Coverage enhancement of DL/UL control channels for low cost MTC", 3GPP TSG RAN WG1 Meeting #75, R1-135105, Nov. 2013, 10 pages.
Alcatel-Lucent, et al., "Considerations for PDSCH/PUSCH and the Physical Downlink Control Channels for LC-MTC", 3GPP TSG RAN WG1 Meeting #80, R1-150128, Feb. 2015, 5 pages.
LG Electronics, "PDSCH/PUSCH coverage enhancement for MTC", 3GPP TSG RAN WG1 Meeting #74bis, R1-134394, Oct. 2013, 5 pages.
European Patent Office Application Serial No. 16783334.2, Search Report dated Feb. 19, 2019, 25 pages.
U.S. Appl. No. 15/565,895, Office Action dated Sep. 28, 2018, 17 pages.

* cited by examiner

: subframe on which MPDCCH transmission is completed
 : subframe (valid subframe) on which PDSCH transmission is started
 : Valid subframe
 : Non-Valid subframe ▨ : subframe on which MPDCCH transmission is completed
▩ : subframe (valid subframe) on which PDSCH transmission is started
▦ : Valid subframe
☐ : Non-Valid subframe ▨ : subframe on which MPDCCH transmission is completed
▩ : subframe (valid subframe) on which PDSCH transmission is started
▨ : Valid subframe
☐ : Non-Valid subframe : subframe on which MPDCCH transmission is completed
 : subframe (valid subframe) on which PDSCH transmission is started
 : Valid subframe
 : Non-Valid subframe ▨ : subframe on which MPDCCH transmission is completed
▩ : subframe (valid subframe) on which PDSCH transmission is started
▦ : Valid subframe
☐ : Non-Valid subframe ▨ : subframe on which MPDCCH transmission is completed
▩ : subframe (valid subframe) on which PDSCH transmission is started
▦ : Valid subframe
☐ : Non-Valid subframe Subframe for D2 reception : subframe on which MPDCCH transmission is completed
: subframe (valid subframe) on which PDSCH transmission is started
: Valid subframe
: Non-Valid subframe

METHOD FOR TRANSMITTING AND RECEIVING DATA CHANNEL, AND LC DEVICE

CROSS-REFERENCE TO RELATED APPLICATIONS

This application is the National Stage filing under 35 U.S.C. 371 of International Application No. PCT/KR2016/002911, filed on Mar. 23, 2016, which claims the benefit of U.S. Provisional Applications No. 62/150,870, filed on Apr. 22, 2015, 62/154,757, filed on Apr. 30, 2015, 62/158,575, filed on May 8, 2015, 62/173,902, filed on Jun. 10, 2015, 62/244,720, filed on Oct. 21, 2015, and 62/251,701, filed on Nov. 6, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, recently, extension or enhancement of cell coverage of a base station (BS) for MTC devices has been considered. However, when an MTC device is placed in a coverage extension (CE) or a coverage enhancement (CE) area, a downlink channel may not be properly received. To this end, the BS may consider to repeatedly transmit the same downlink channels on a plurality of subframes.

However, according to legacy LTE technology, PDCCH and PDSCH are transmitted on one subframe. If the PDCCH and the PDSCH are repeatedly transmitted according to the CE, the MTC device must store all transmission repetitions of the PDSCH until it repetitively receives and decodes all the repeatedly transmitted PDCCHs.

Further, according to the legacy LTE technology, when the PDCCH is received on the subframe n, the MTC device transmits the PUSCH on the subframe n+k. However, when the PDCCH is repeatedly received according to the CE, the MTC device is less likely to know when the transmission timing of the PUSCH is.

SUMMARY OF THE INVENTION

Accordingly, a disclosure of the present specification has been made in an effort to solve the aforementioned problem.

To achieve the foregoing purposes, the disclosure of the present invention proposes a method for receiving a physical downlink shared channel (PDSCH). The method may be performed by a low-cost/low-capability (LC) device and comprise: if the LC device is configured for a coverage enhancement, receiving repetitions of a downlink control channel; determining a plurality of downlink subframes for receiving repetitions of the PDSCH, based on the repetitive reception of the downlink control channel; determining whether there exists a gap subframe among the plurality of downlink subframes; and dropping the reception of the PDSCH on the gap subframe.

If a number of the repetitions is N, the N may be counted only using valid downlink subframes. Here, the valid downlink subframe may be pre-configured.

The method may further comprise: receiving a SIB including information on valid downlink subframe.

The method may further comprise: counting a total number of downlink subframes including other downlink subframes being not used for the reception in order to receive the repetitions of the PDSCH.

To achieve the foregoing purposes, the disclosure of the present invention proposes a method for transmitting a physical uplink shared channel (PUSCH). The method may be performed by a low-cost/low-capability (LC) device and comprise: if the LC device is configured for a coverage enhancement, receiving repetitions of a downlink control channel; determining a plurality of downlink subframes for transmitting repetitions of the PUSCH, based on the repetitive reception of the downlink control channel; determining whether there exists a gap subframe among the plurality of downlink subframes; and dropping a transmission of the PUSCH on the gap subframe.

If a number of the repetitions is N, the N may be counted only using valid subframes. The valid subframe may be pre-configured.

The method may further comprise: receiving a SIB including information on valid subframe.

The method may further comprise: using values of redundancy version which are cyclically indexed over consecutive subframes including valid subframes as well as invalid subframes.

To achieve the foregoing purposes, the disclosure of the present invention proposes a low-cost/low-capability (LC) device for receiving a physical downlink shared channel (PDSCH). The LC device may comprise: a transceiver which receives repetitions of a downlink control channel if the LC device is configured for a coverage enhancement; and a processor which determines a plurality of downlink subframes for receiving repetitions of the PDSCH, based on the repetitive reception of the downlink control channel, determines whether there exists a gap subframe among the plurality of downlink subframes, and drop the reception of the PDSCH on the gap subframe.

To achieve the foregoing purposes, the disclosure of the present invention proposes a low-cost/low-capability (LC) device for transmitting a physical uplink shared channel (PUSCH). The LC device may comprise: a transceiver which receives repetitions of a downlink control channel, if the LC device is configured for a coverage enhancement; a processor which determines a plurality of downlink subframes for transmitting repetitions of the PUSCH, based on the repetitive reception of the downlink control channel, determines whether there exists a gap subframe among the plurality of downlink subframes, and drops a transmission of the PUSCH on the gap subframe.

According to the disclosure of the present specification, the problems of the above-described prior art are solved.

DESCRIPTION OF EXEMPLARY EMBODIMENTS

Figure 1:
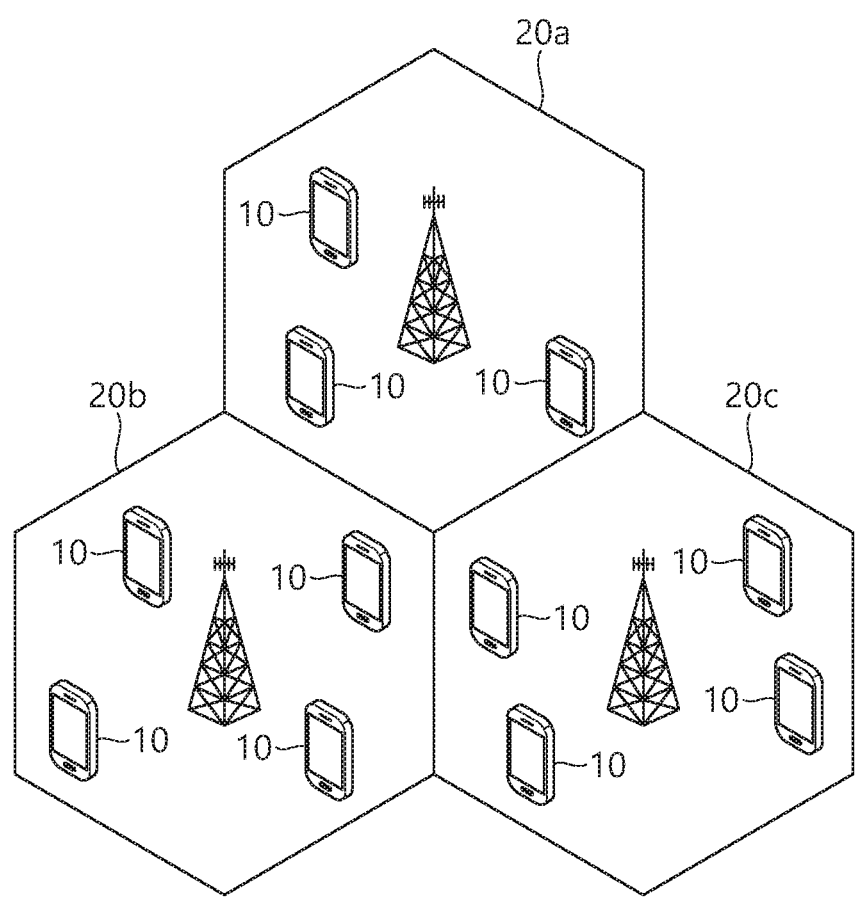
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
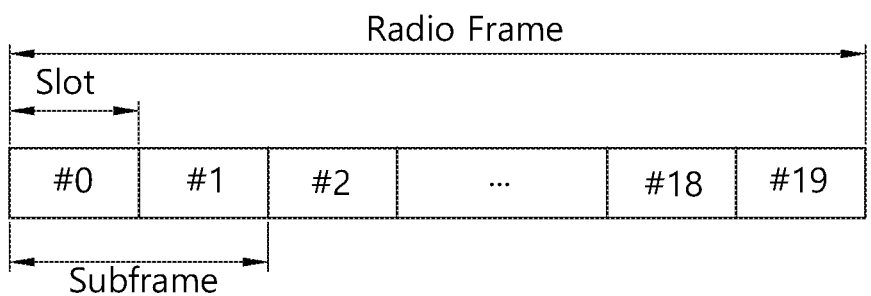
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).\

Figure 3:
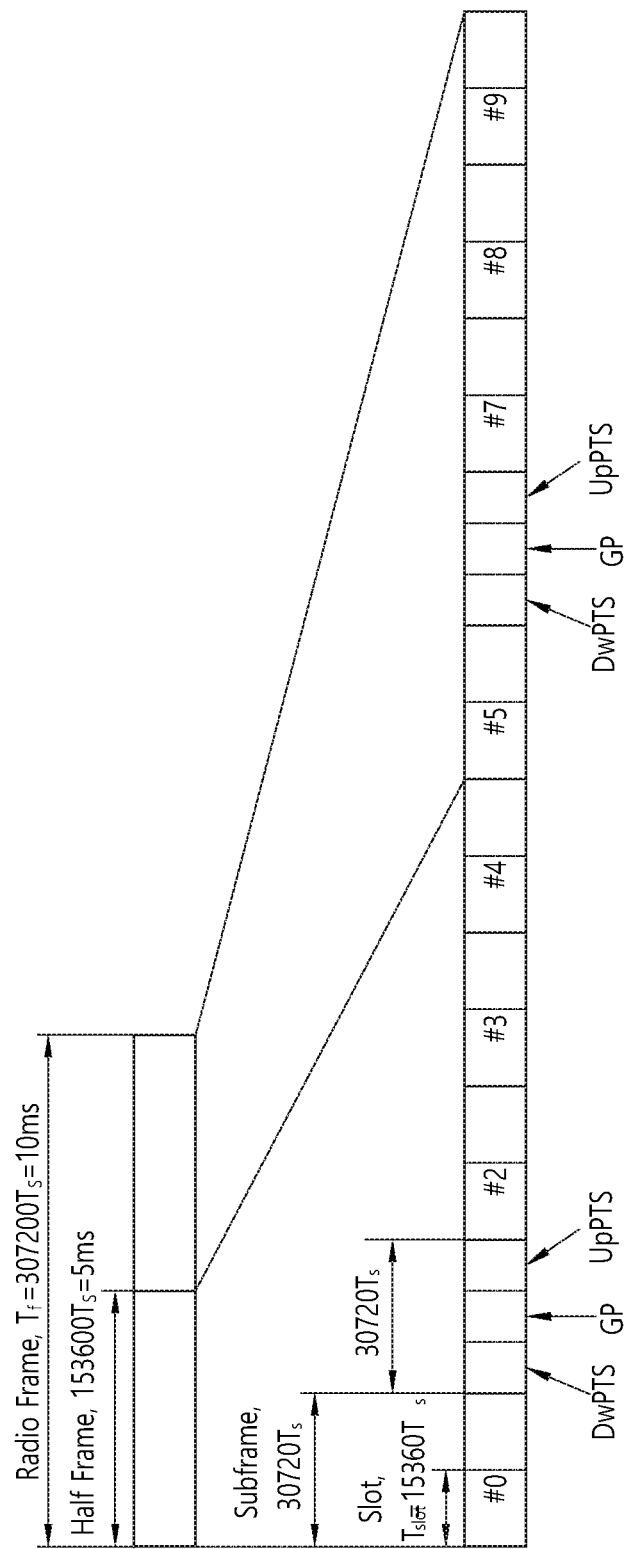
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
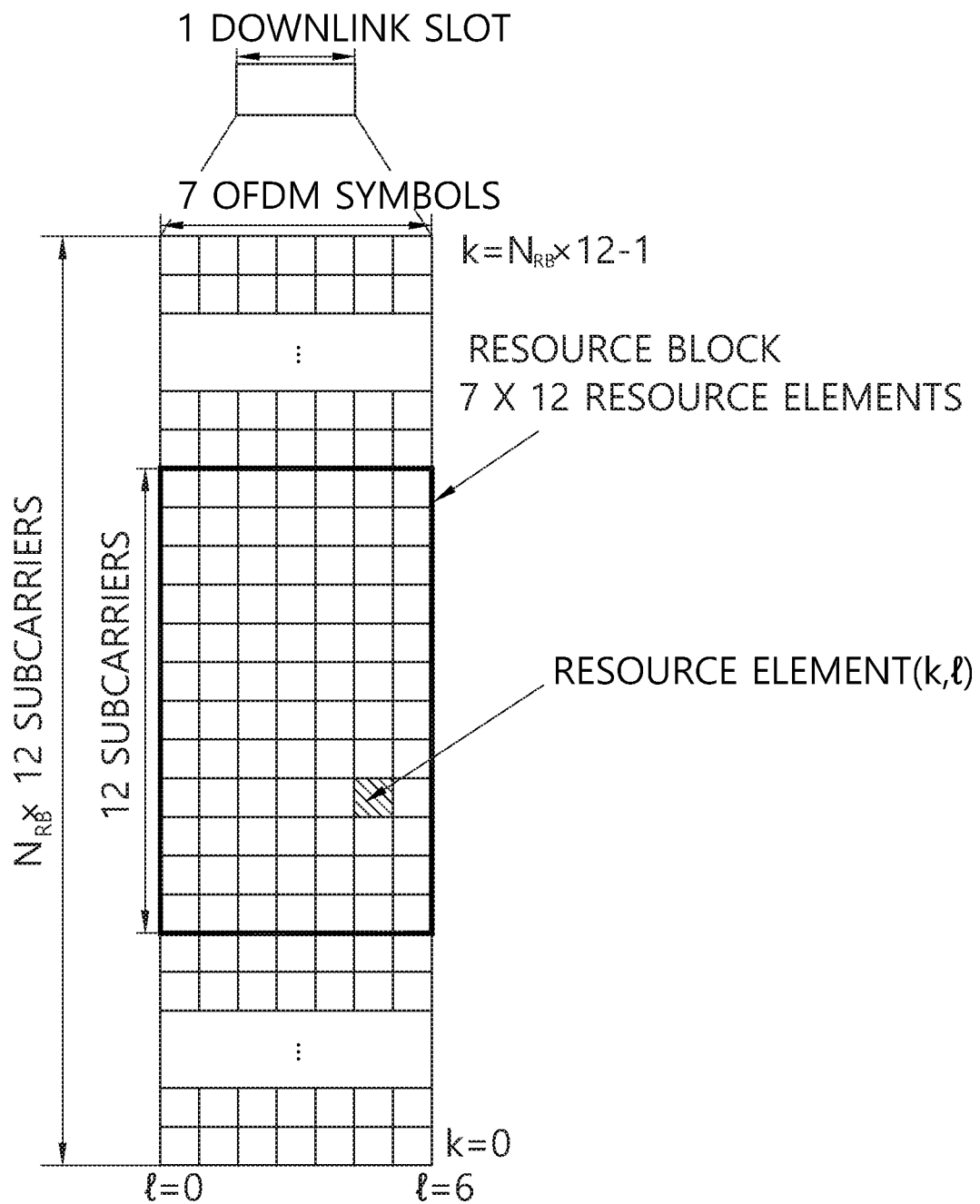
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
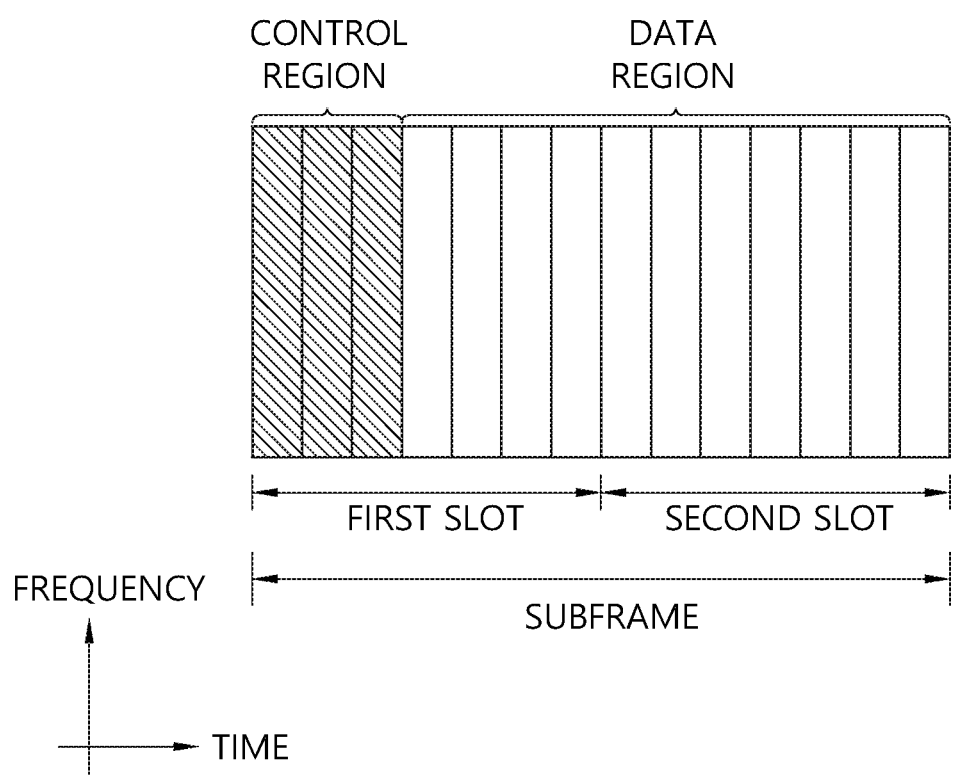
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |

TABLE 3-continued

| Transmission mode | DCI format | Search space | Transmission mode of PDSCH according to PDCCH |
|---|---|---|---|
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmissiom mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 5

| Field | Bit number |
| --- | --- |
| Carrier indicator | 0 or 3 bits |
| Flag for format0/format1A differentiation | 1 bit |
| FH (Frequency hopping) flag | 1 bit |
| Resource block allocation and hopping resource allocation | |
| MCS (Modulation and coding scheme) and RV (redundancy version) | 5 bits |
| NDI (New data indicator) | 1 bit |
| TPC | 2 bits |
| Cyclic shift for DM RS and OCC index | 3 bit |
| UL index | 2 bits |
| DAI (Downlink Allocation Index) | 2 bits |
| CSI request | 1 or 2 bits |
| SRS request | 0 or 1 bit |
| Resource allocation type | bit |

In the above table, the redundancy version (RV) is used for the HARQ operation that will be described below. The redundancy version (RV) field may include any one of 1, 2, 3 and 4. 1, 2, 3 and 4 are repeatedly used in circular manner.

The uplink channels include a PUSCH, a PUCCH, an SRS (Sounding Reference Signal), and a PRACH (physical random access channel).

Figure 6:
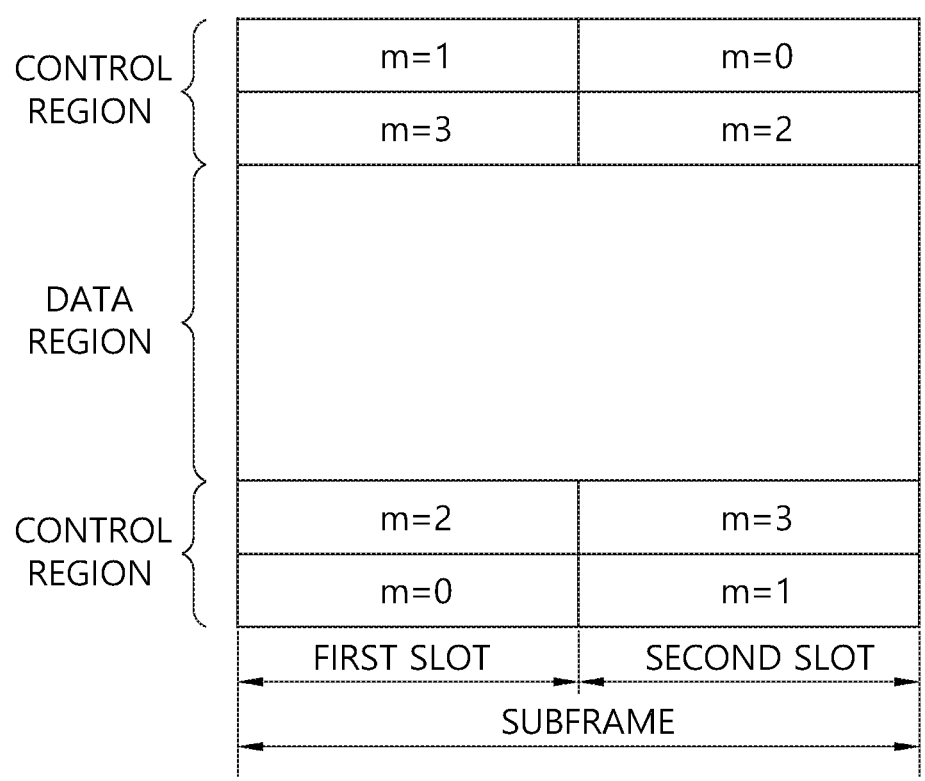
FIG. 6 illustrates a structure of an uplink subframe in 3GPP LTE.

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indcated as a primary cell in a handover procedure. The secondary cell signifies a cell opearting in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<EPDCCH (Enhanced Physical Downlink Control Channel)>

Meanwhile, a PDCCH is monitored in a limited region called a control region within a subframe, and a CRS transmitted in the entire band is used for demodulation of the PDCCH. As types of control information are diversified and an amount of control information is increased, flexibility of scheduling only with the existing PDCCH is lowered. Also, in order to reduce a burden due to CRS transmission, an enhanced PDCCH (EPDCCH) has been introduced.

Figure 7:
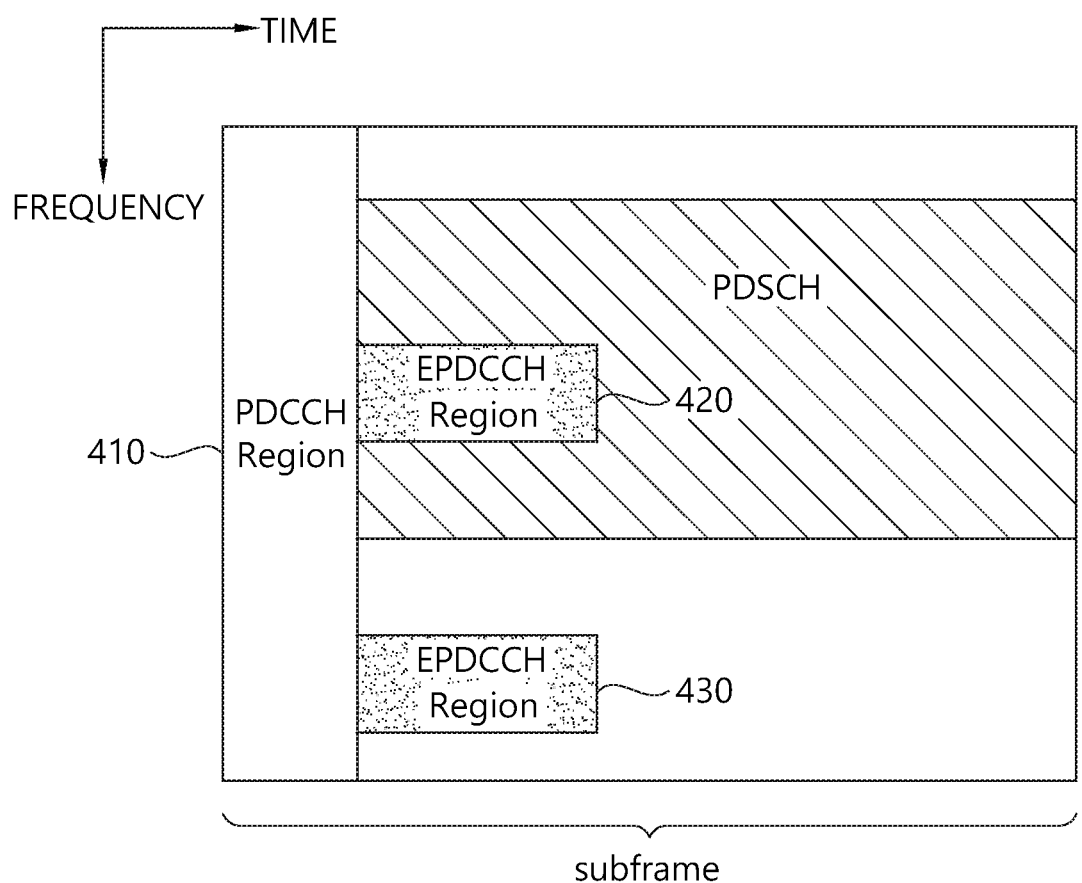
FIG. 7 illustrates an example of a subframe having an EPDCCH.

FIG. 7 illustrates an example of a subframe having an EPDCCH.

A subframe may include zero or one PDCCH region 4100 and zero or more PEDCCH regions 420 and 430.

The PEDCCH regions 420 and 430 are regions in which a wireless device monitors an EPDCCH. The PDCCH region 410 is positioned within a maximum of four preceding OFDM symbols, while the EPDCCH regions 420 and 430 may be flexibly scheduled in subsequent OFDM symbols after the PECCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the PEDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, rather than a CRS, may be defined to demodulate an EPDCCH. An associated DM RS may be transmitted in the EPDCCH regions 420 and 430.

Each of the EPDCCH regions 420 and 430 may be used to perform scheduling on different cells. For example, an EPDCCH within the EPDCCH region 420 may carry scheduling information for a primary cell and an EPDCCH within the EPDCCH region 430 may carry scheduling information for a secondary cell.

When an EPDCCH is transmitted in the EPDCCH regions 420 and 430 through multiple antennas, the same precoding as that of an DPCCH may be applied to a DM RS within the EPDCCH regions 420 and 430.

Compared with a PDCCH which uses a CCE as a transmission resource unit, a transmission resource unit for an EPDCCH is called an enhanced control channel element (ECCE). An aggregation level (AL) may be defined by a resource unit for monitoring an EEPDCCH. For example, when 1 ECCE is a minimum resource for an EPDCCH, an AL may be defined as AL=[1, 2, 4, 8, 16].

Hereinafter, an EPDCCH search space may correspond to an EPDCCH region. In the EPDCCH search space, one or more EPDCCH candidates may be monitored in one or more ALs.

Hereinafter, resource allocation for an EPDCCH will be described.

The EPDCCH is transmitted using one or more ECCEs. Each ECCE includes a plurality of enhanced resource element groups (EREEGs). An ECCH may include four eight EREGs according to a CP and a subframe type according to time division duplex (TDD) DL-UL. For example, in a normal CP, the ECCE may include 4 EREGs, and in an extended CP, the ECCE may include 8 EREGs.

A physical resource block (PRB) pair refers to two PRBs having the same RB number in one subframe. The PRB pair refers to a first PRB of a first slot and a second PRB of a second slot. In a normal CP, a PRB pair includes 12 subcarriers and 14 OFDM symbols, and thus, the PRB pair includes 168 source elements (REs).

The EPDCCH search space may be set as one or a plurality of PRB pairs. One PRB pair includes 16 EREGs. Thus, when an ECCE includes 4 EREGs, a PRB pair includes four ECCEs, and when an ECCE includes 8 EREGs, a PRB pair includes two ECCEs.

<Machine Type Communication (MTC)>

Meanwhile, hereinafter, the MTC will be described.

Figure 8A:
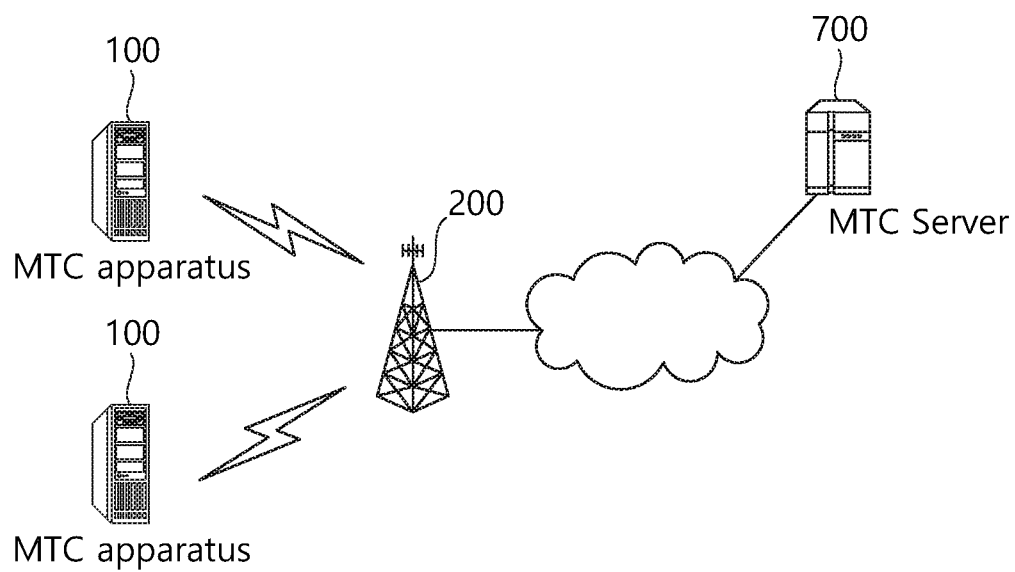
FIG. 8A illustrates an example of machine type communication (MTC).

FIG. 8A illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 8B:
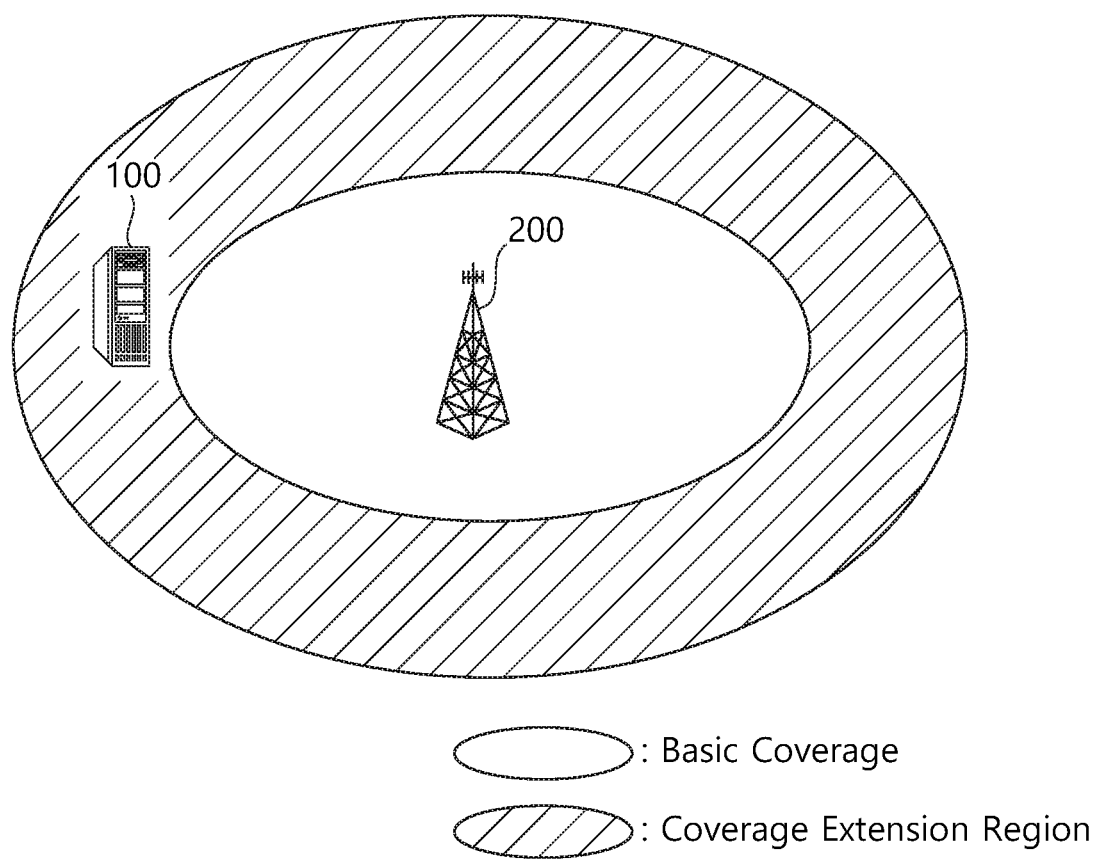
FIG. 8B illustrates extension or enhancement of cell coverage for an MTC device.

FIG. 8B illustrates an example of cell coverage extension for an MTC device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 9:
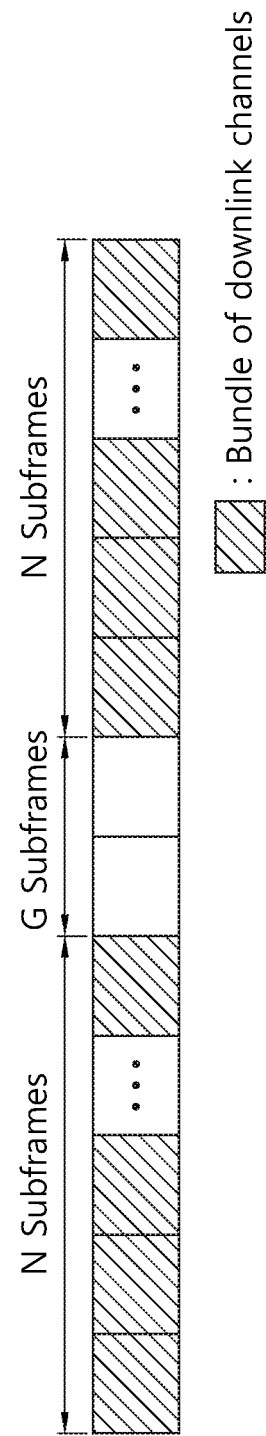
FIG. 9 illustrates an example of transmitting a bundle of downlink channels.

FIG. 9 is an exemplary diagram illustrating an example of transmitting a bundle of downlink channels.

As known with reference to FIG. 9, the base station repeatedly transmits he downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Figure 10A:
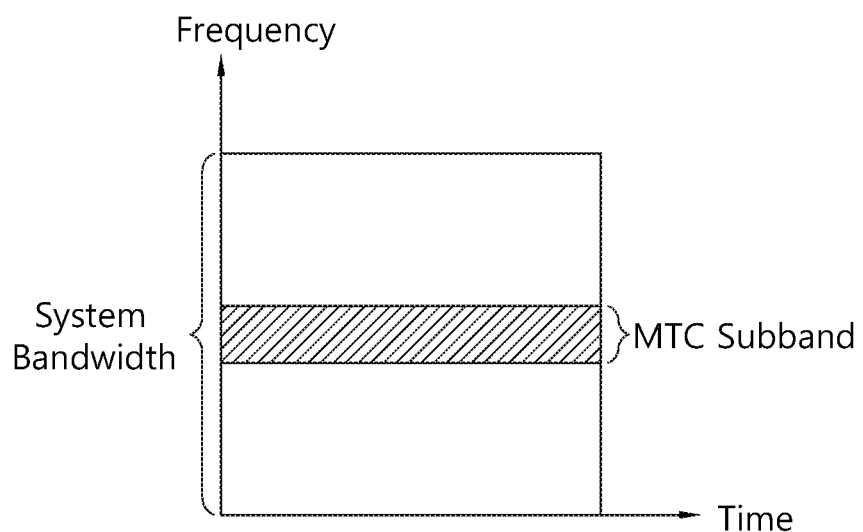
FIG. 10a and FIG. 10b are examples of subbands for MTC device operation.
Figure 10B:
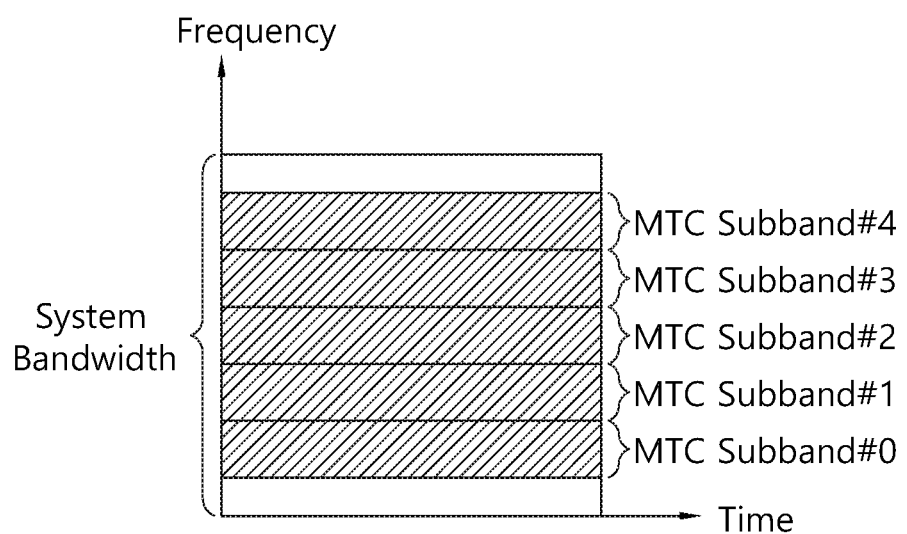

FIGS. 10A and 10B are views showing examples of a subband for operation of an MTC device.

As one scheme for low cost of the MTC device, as shown in FIG. 10A, regardless of the system bandwidth of the cell, the MTC device may use a subband of about 1.4 MHz for example.

In this connection, the region of the subband for operation of the MTC device may be located in the central region (for example, six middle PRBs) of the system bandwidth of the cell as shown in FIG. 10A.

Alternatively, as shown in FIG. 10B, multiple subbands for the MTC devices are allocated in one subframe for multiplexing between MTC devices. Thus, the MTC devices may use different subbands. In this connection, most of the MTC devices may use other subbands rather than the central region (for example, middle six PRBs) of the cell's system band.

Further, the MTC device operating on the reduced band may not properly receive the legacy PDCCH transmitted from the base station on the entire system band. Further, considering multiplexing with PDCCHs transmitted to other general UEs, it may not be desirable for the cell to transmit the PDCCH for the corresponding MTC device in an OFDM symbol region for legacy PDCCH transmission.

As one way to solve this problem, it is necessary to introduce a control channel for the corresponding MTC device which is be transmitted within the subband for operation of the MTC with low-complexity/low-specification/low-cost.

Figure 11:
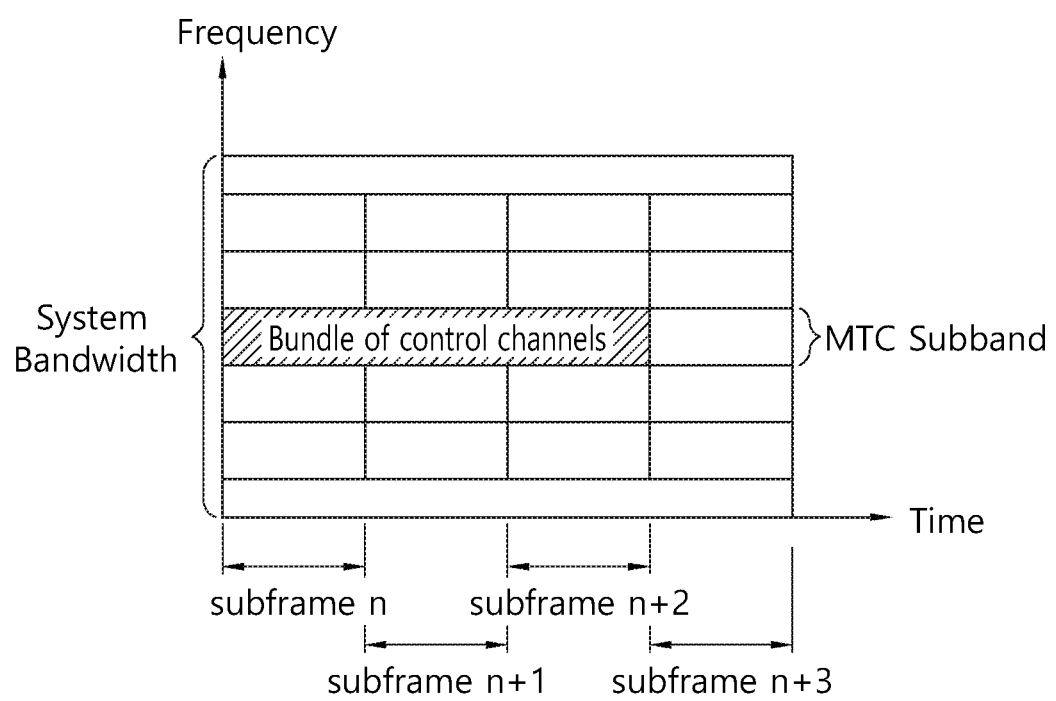
FIG. 11 shows one example of a control channel being transmitted in a subband for MTC device operation.

FIG. 11 shows one example of a control channel transmitted in a subband for operation of an MTC device.

As seen from FIG. 11, when the MTC device operates on any MTC subband in the system bandwidth of the cell, rather than operating using the entire system bandwidth of the cell, the base station may transmit a control channel for the MTC device in the MTC subband. Such a control channel may be repeatedly transmitted on a plurality of subframes.

This control channel may be similar to the legacy EPDCCH. That is, the control channel for the MTC device may be generated using the legacy EPDCCH as it is. Alternatively, the control channel (or M-PDCCH) for the MTC device may be a variant of the legacy PDCCH/EPDCCH.

Hereinafter, the control channel for the MTC device having the low-complexity/low-specification/low-cost is referred to as MTC-EPDCCH or M-PDCCH. This MTC-EPDCCH or M-PDCCH may be used for an MTC device. Alternatively, MTC-EPDCCH or M-PDCCH may be used for generic UEs with low-complexity/low-specification/low-cost. Alternatively, MTC-EPDCCH or M-PDCCH may be used for a UE located in a coverage extension or coverage enhancement zone.

<Problematic Scenario Presented Herein>

According to the current LTE standard, a legacy UE may decode a PDSCH on a subframe used for PDCCH reception. However, in a situation where a coverage extension/enhancement (CE) is configured, both PDCCH and PDSCH may be repeatedly transmitted over several subframes. Therefore, it is difficult for the MTC device to know correctly when to receive the PDSCH after receiving the PDCCH, that is, the reception timing of the PDSCH.

Therefore, a new definition about the reception timing of the PDSCH may be required.

Further, when the M-PDCCH and the PDSCH are concurrently transmitted repeatedly on the same subframe as in the current LTE standard, the MTC device cannot receive the PDSCH until the MTC device has successfully decoded the M-PDCCH. Thereby, until the M-PDCCH has been successfully decoded, the MTC device must store all the PDSCHs therein. This is a problem.

Embodiments of the Present Disclosure

Accordingly, embodiments of the present disclosure aim to provide a solution to this problem. Hereinafter, in the present disclosure, an MTC device with low-complexity/low-capability/low-specification/low-cost is referred to as an LC device.

First, according to embodiments of the present disclosure, coverage extension/enhancement (CE) may be categorized into two modes as follows.

In the first mode (also referred to as CE mode A), no iterative transmission is performed, or a small number of iterative transmissions are performed.

In the second mode (also referred to as CE mode B), a large number of repetitive transmissions are performed.

An indication of which of the above two modes to be activated may be signaled to the LC device.

In this connection, the parameters assumed by the LC device for transmission and reception of the control channel/data channel may vary based on the CE mode. Further, the DCI format that the LC device monitors may vary based on the CE mode. However, some physical channels may be repeatedly transmitted the same number of times regardless of whether the corresponding mode is CE mode A or CE mode B.

Meanwhile, according to embodiments of the present disclosure, an LC device that allows a delay in data transmission/reception may receive a bundle of PDSCHs or a bundle of PUSCHs after receiving a bundle of M-PDCCHs.

Figure 12A:
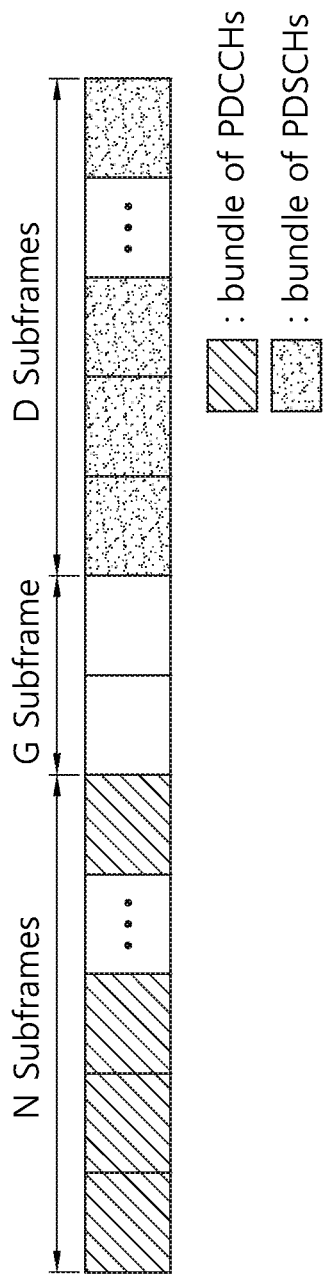
FIG. 12a shows an example of transmission of a M-PDCCHs bundle and a PDSCHs bundle according to embodiments of the present disclosure.

FIG. 12A shows an example of transmission of a bundle of M-PDCCHs and a bundle of PDSCHs according to an embodiment of the present disclosure.

Referring to FIG. 12A, the base station may repeatedly transmit the same M-PDCCH over a plurality of (e.g., N) subframes to an LC device requiring coverage extension/enhancement (CE). That is, the base station may transmit a bundle of M-PDCCHs over a plurality of (e.g., N) subframes. Further, the base station may repeatedly transmit the same PDSCH over a plurality (for example, D) of subframes. That is, the base station may transmit a bundle of PDSCHs over a plurality (for example, D) of subframes. In this connection, the bundle of the PDSCHs may be transmitted after a predetermined gap, for example, G subframes, after the transmission of the bundle of the PDCCHs is completed. That is, for example, if the transmission of the bundle of the M-PDCCHs has been completed at the N−1 subframe, the PDSCH bundle may be transmitted over the D number of subframes which starts on a N+G subframe. In this connection, the values of N and D may always be configured as to be the same. Alternatively, information about the value of D may be carried in the M-PDCCH.

On the other hand, the LC device requiring the coverage extension/enhancement (CE) may similarly transmit a bundle of uplink channels (for example, PUCCHs and/or PUSCHs) to the base station over several subframes.

Figure 12B:
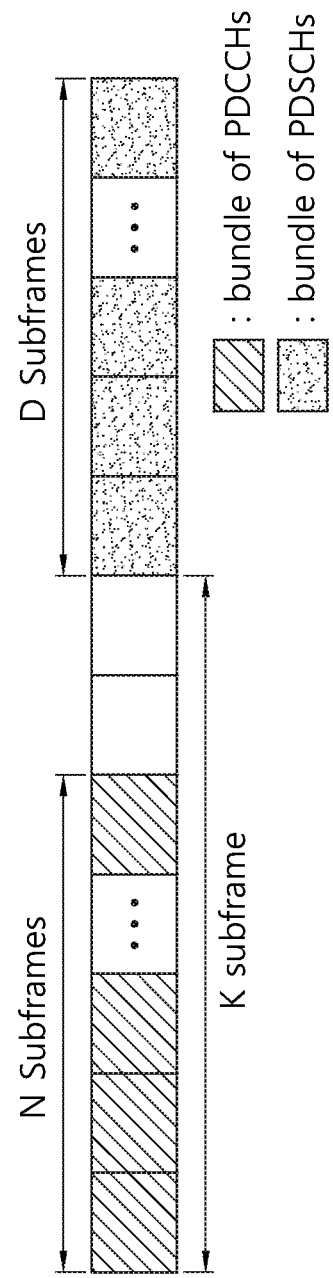
FIG. 12b shows an example of transmission of a bundle of M-PDCCHs and a bundle of PUSCHs according to the embodiments of the present disclosure.

FIG. 12B is an exemplary diagram illustrating an example of transmission of a bundle of M-PDCCHs and a bundle of PUSCHs according to embodiments of the present disclosure.

Referring to FIG. 12B, the same M-PDCCH is transmitted repeatedly N times over N subframes, and, the LC device receives the bundle of these M-PDCCHs, and then, after G subframes, the same PUSCH is transmitted repeatedly U times over U subframes, and the LC device may receive a bundle of PUSCHs.

In FIGS. 12A and 12B, the G value corresponding to the number of subframes between the subframes for transmission of the bundle of PDSCHs/PUSCHs and the subframes for transmission of the bundle of M-PDCCHs may be fixed. Alternatively, the G value may be signaled to the LC device via a higher layer signal, such as a Master Information Block (MIB), a System Information Block (SIB), or an RRC signal. Alternatively, the G value corresponding to the number of subframes between the subframes for transmission of the bundle of the PDSCHs/PUSCHs and the subframes for transmission of the bundle of the M-PDCCHs may be fixed to zero. That is, immediately after the transmission of the bundle of the M-PDCCHs is completed, the bundle of the PDSCH/PUSCHs may be transmitted. Alternatively, the G value corresponding to the number of subframes between the subframes for transmission of the bundle of the PDSCHs/PUSCHs and the subframes for transmission of the bundle of the M-PDCCHs may be fixed to 4. Alternatively, the G value may be fixed to the same value as when the iterative transmission of the M-PDCCH is not configured.

Alternatively, if the subframe corresponding to the start position of the scheduled transmission of the bundle of PDSCHs/PUSCHs after the transmission of the bundle of the M-PDCCHs is a subframe on which transmission of the PDSCH/PUSCH is not possible, transmission of the bundle of PDSCHs/PUSCHs may be scheduled to be started on the nearest subframe to and after the corresponding subframe among subframes on which the PDSCH/PUSCH is allowed.

Further, as another scheme for indicating the start position for transmission of the PDSCH/PUSCH as indicated by the corresponding M-PDCCH after receiving the M-PDCCH, the LC device may assume that after a certain time after receiving the bundle of M-PDCCHs, the transmission of the bundle of PDSCHs/PUSCHs starts. If the difference between the position of the subframe corresponding to the transmission start point of the M-PDCCH bundle and the position of the subframe corresponding to the transmission start point of the PDSCH/PUSCH bundle is K subframes (for example, K=100, 200), the LC device needs to know a subframe on which the M-PDCCH transmission starts. For example, When K=(a subframe index corresponding to a transmission start position of PDSCH/PUSCH)−(a subframe index corresponding to a transmission start position of an M-PDCCH), the LC device must know the transmission start time of the M-PDCCH in order to successfully know the PDSCH/PUSCH transmission start time. To the contrary, in this scheme, even when the LC device does not know the interval of the subframes for transmission of the M-PDCCH bundle, the position of the subframe corresponding to the transmission start position of the PDSCH may be known to the LC device.

In this case, the K value may be fixed or signaled to the LC device via an upper layer signal, such as an MIB, SIB, or RRC signal. In this connection, the value of K may always be configured to be equal to the number of M-PD-DCHs in the M-PDCCH bundle. That is, the bundle transmission of the PDSCH/PUSCH may be started from a subsequent subframe immediately after the bundle transmission of the M-PDCCH is completed. Alternatively, when a bundle of M-PDCCHs is transmitted over N subframes, a difference K between a subframe position corresponding to a transmission start position of the M-PDCCH bundle and a subframe position corresponding to a transmission start position of the PDSCH/PUSCH bundle may be set to N−1. That is, the transmission of the PDSCH/PUSCH bundle may be started on the very subframe on which the transmission of the bundle of the M-PDCCH subframe is completed.

Alternatively, when the LC device receives the M-PDCCH bundle, the LC device may transmit A/N information for M-PDCCH reception to the base station using the uplink resource after G1 subframes. This is described below with reference to FIG. 13.

Figure 13:
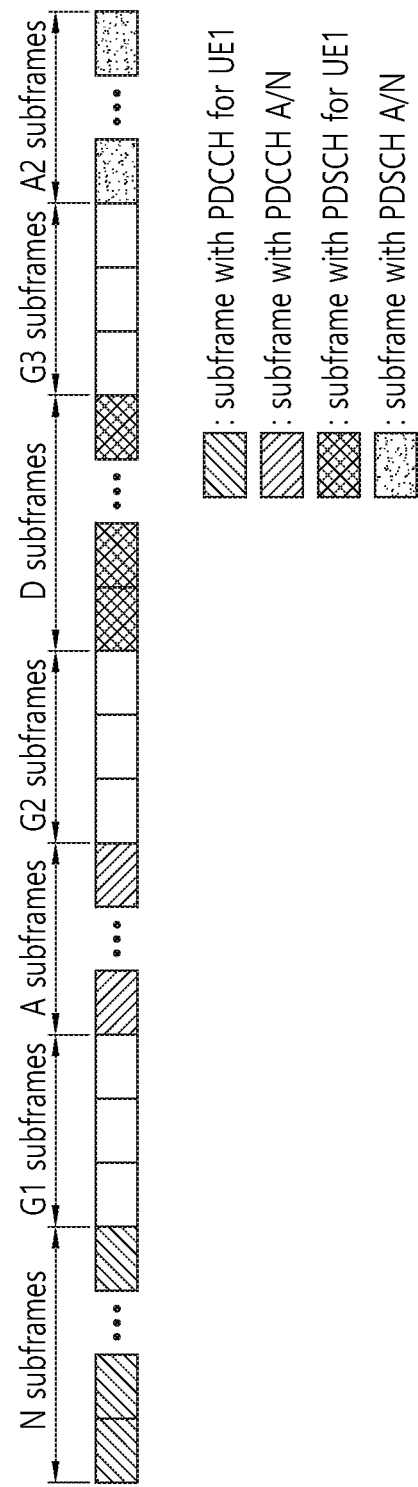
FIG. 13 shows the transmission and reception timing of the bundle.

FIG. 13 shows an example of transmission and reception timing of the bundle.

As may be seen by referring to FIG. 13, when a bundle of LC device-specific (or UE-specific) M-PDCCHs is received or a bundle of M-PDCCHs is received through a UE-specific search space (USS), the LC device may transmit ACK (acknowledgment)/NACK (Negative-Acknowledgment) information for M-PDCCH reception to the base station using an uplink resource after G1 subframes. In this connection, illustratively, the G1 value may be 4, and the ACK/NACK information may be transmitted over the bundle of A uplink subframes.

Further, referring to FIG. 13, when ACK/NACK information for the M-PDCCH reception is received by the base station from the LC device, if the corresponding ACK/NACK information is ACK, the base station transmits the PDSCH over the bundle of D subframes after the G2 subframes after receiving the ACK/NACK information. Upon receiving all the bundle of PDSCHs, the LC device may transmit ACK/NACK information for PDSCH reception over the bundle of A2 uplink subframes after G3 subframe after receiving all the bundle of PDSCHs. In this connection, the values of G1, G2, G3, A, and A1 may be fixed, or may be signaled to the LC device via higher layer signals such as MIB, SIB, or RRC signals. Alternatively, the LC device may transmit all the bundle of PUSCHs to the base station, and, thereafter, after the G3 subframe, transmit ACK/NACK information on the PUSCH reception over the bundle of A2 uplink subframes.

In this connection, the values of G1, G2, G3, A, and A1 may be fixed, or may be signaled to the LC device via higher layer signals such as MIB, SIB, or RRC signals. In this connection, the values of N, D, A, and A2 may always be configured identically. By way of example, the G2 value may be 4, the G3 value may be 4, or G3 may be the same value as when the bundle transmission of PDSCHs/PUSCHs is not configured.

In the following, embodiments of the present disclosure will be further described in more detail.

I. First Embodiment of the Present Disclosure: Transmission Timing of PDSCH, PUSCH, PUCCH (A/N)

If a general coverage is configured for an LC device or a coverage enhancement (CE) is configured for the LC device, the LC device may use cross-subframe scheduling. The LC device may support self-subframe scheduling, but it is assumed that cross-subframe scheduling is applied first. The LC device may assume that the self-subframe scheduling applies only when coverage is specially configured. Alternatively, the self-subframe scheduling is used by default, and the LC device may assume that cross-subframe scheduling is used only when coverage enhancement or iterative transmission techniques are used. In this case, when the subframe corresponding to the EPDCCH reception end position is subframe #n, reception of the corresponding PDSCH may be started from a subframe #n+K1. Further, when a subframe corresponding to the reception end of the EPDCCH is referred to as a subframe #n, the transmission of the corresponding PUSCH may be started from the subframe #n+K2. Further, when a subframe corresponding to the reception end of the PDSCH is referred to as a subframe #n, the transmission of the PUCCH containing ACK/NACK information for reception of the corresponding PDSCH may be started from the subframe #n+K3. However, in the HD (half duplex)-FDD, PDSCH cannot be received on a guard subframe required for switching from uplink to downlink (UL to DL switching) and switching from downlink to uplink (DL to UL switching), on a gap subframe which is the time required for re-tuning the RF unit for frequency (that is, subband) hopping, or on a TDD-based special subframe on which no data cannot be received. Further, when the PRB for PDSCH reception overlaps with the PRB for PBCH reception, or when the PRB for PDSCH reception overlaps with the PRB for PSS/SSS reception, the PDSCH may not be received. Alternatively, when a subframe on which the PDSCH is to be received is configured as an MBSFN subframe, the PDSCH may not be received. These subframes cannot be used for downlink reception, but may be used as a time gap for switching between uplink and downlink or for frequency retuning.

In this section, timing (K1) for receiving PDSCH after receiving M-PDCCH, timing (K2) for transmitting PUSCH after receiving M-PDCCH, timing (K3) for transmission of PUCCH after receiving PDSCH will be proposed.

I-1. Definition of Gap Subframe/Gap Slot

The gap subframe/gap slot refer s to the time that the LC device needs for frequency retuning or UL/DL switching. In this connection, when the LC device performs frequency retuning or UL/DL switching at any time, the gap subframe/gap slot mismatch may occur between the base station and the LC device. To avoid this, the applicants propose that the gap subframe/gap slot is assumed to be located in a subframe/slot immediately previous to a subframe/slot used to send or receive data or to transmit data. For example, when the base station transmits downlink scheduling for the PDSCH on a different subband to the LC device on a subframe n and transmits the PDSCH on a subframe n+4 to the LC device, it may be assumed that the LC device switches to the different subband on a subframe n+3. In this connection, it may be assumed that the base station may also know the above assumption. This is because that, if the LC device is already monitoring the subband to be used for PDSCH reception for some reasons, and the network or base station may not know the monitoring (this is not the case when the subband used for control channel transmission is switched to the subband for PDSCH transmission), the network or base station may consider non-change of a gap subframe thereof even when the LC device does not actually switch. Such a dynamic gap is considered by the network or base station to be used only when a gap is needed. For example, when the base station transmits data in the same subband, it is not necessary to assume that a gap is required between two data transmissions. When the network or base station needs an unexpected gap subframe for some reasons (for example, measurement, CSS monitoring, paging, SIB reception, etc.), this gap subframe is considered a valid subframe. In other words, on the network's view, this gap subframe is not regarded as an invalid subframe but is recognized as a valid subframe. This means that the valid subframe may be used for repeated transmission or timing. In other words, the network or base station may assume that the LC device preforms frequency retuning on the immediately preceding subframe. The network or base station may assume that if the frequency retuning is not required, that there is no gap subframe.

For example, if the LC device hops a logical subband according to a specific hopping pattern, it may be assumed that this hopping occurs at a constant frequency. For example, when assuming that the hopping is performed every K subframes, for example, when assuming that a K-th subframe is used as a gap subframe for hopping, the K-th subframe may always be assumed to be a gap subframe, regardless of whether the actual hopping is performed.

I-2. Definition of Invalid Subframe

Like the gap subframe, the invalid subframe may also be considered to be dynamically or semi-statically determined. Subframes that are dynamically determined to be invalid may include subframes for switching from downlink to uplink or for switching from uplink to downlink, and may also include dynamic gap subframes. In this connection, the gap subframe may also be included in the invalid subframe.

Among the dynamic gap subframes, a gap subframe that is not known to the network or base station may be considered a valid subframe, rather than an invalid subframe. The gap subframe, which is unknown to the network or base station may refer to a subframe corresponding to the time for frequency retuning to receive a cell-common channel, or the time to retune the frequency to receive cell-common data. The cell-common channel or cell-common data may include, for example, SIB update/PBCH update/random access response (RAR). A gap subframe that a network or base station may identify may refer to a gap subframe that occurs when the LC device expects to receive scheduling as the network or base station performs or instruct the scheduling.

The invalid subframe may also include the subframe that is dynamically determined to be invalid and a subframe which is considered to be invalid via a semi-static configuration (for example, DL/UL configuration) of the network or base station.

I-3. Timing of PDSCH

The LC device may assume that, transmission of the corresponding PDSCH starts after K valid subframes satisfying a certain condition, after receiving the M-PDCCH. In this connection, the value of K may be 2 or 3 for transmission of the PDSCH. Alternatively, the value of K may be 1 for transmission of the PDSCH.

For example, when transmission of the M-PDCCH from the base station is terminated on the subframe #n, and there are X invalid subframes until it is satisfied that there is the presence of K valid subframes after the subframe #n, transmission of the corresponding PDSCH may be initiated by the base station from the subframe #n+X+K. In this connection, the value of K for the transmission of PDSCH may be 2 or 3. Alternatively, the value of K for transmission of the PDSCH may be 1. This will be described with reference to FIG. 14.

Figure 14A:
FIG. 14a to FIG. 14c show examples of timing of the PDSCH.
Figure 14A:
Figure 14A:
Figure 14A:
Figure 14A:
Figure 14B:
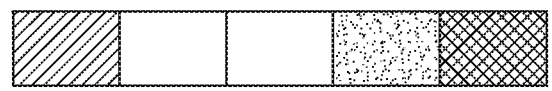
Figure 14C:

FIGS. 14a to 14c show examples of timing of the PDSCH.

For example, as shown in FIG. 14a, if K is 2, and there are two valid subframes immediately after the subframe corresponding to the M-PDCCH transmission termination point, transmission of the PDSCH may be started on the second valid subframe.

Alternatively, when at least one invalid subframe exists, as shown in FIGS. 14b and 14c, transmission of the PDSCH may be triggered by the base station when it is satisfied that two valid subframes are present except for the at least one invalid subframe.

When K subframes contains only valid subframes satisfying specific conditions, such a valid subframe may be as follows. In this connection, the valid subframe may be defined to satisfy all or some of the following conditions:

i) Subframes not used as gap subframe (or switching subframe) for frequency hopping (or subband hopping) or for frequency retuning, or otherwise, subframes not configured as a gap subframe by the network or base station for the frequency retuning. In this connection, a gap subframe to be newly generated for receiving a PDSCH on a different subband according to cross-subband scheduling may not be included in the invalid subframe.

ii) In the case of HD-FDD, a subframe that is not used as a gap or guard subframe for switching from uplink to downlink or for switching from downlink to uplink In the case of downlink scheduling, such a subframe may only refer to subframes that are not used as gap subframes for switching from uplink to downlink Alternatively, in the case of uplink scheduling, such a subframe may only mean a subframe that is not used as a gap subframe for switching from downlink to uplink.

iii) In the case of TDD, a subframe that is not a UL subframe iv) In the case of TDD, a subframe other than the special subframe, or a subframe other than the special subframe when the length of the DwPTS is less than or equal to x v) In case of TDD, a subframe configured as a DL subframe vi) In the case of HD-FDD, a subframe not used for uplink transmission vii) A subframe on which the cell-common PDSCH is not transmitted, or a subframe on which the LC device does not expect to receive the cell-common PDSCH, or a subframe in which the LC device does not receive the cell-common PDSCH viii) A subframe other than a MBSFN subframe ix) A subframe configured as a subframe on which the LC device may receive downlink data and/or downlink control channels.

x) A subframe that is not a subframe after receiving M-PDCCH\ xi) A subframe other than a subframe on which transmission of PSS/SSS/PBCH occurs, when the PRB region for transmission of PSS/SSS/PBCH by the base station and the region of PRB resource for transmission of M-PDCCH and/or PDSCH by the base station are partially or entirely overlapped with each other xii) A subframe other than a subframe for transmission of PSS/SSS/PBCH, when the PRB region for transmission of PSS/SSS/PBCH and the region of PRB resource included in a subband for transmission of M-PDCCH and/or PDSCH for operation of the LC device are overlapped partially or entirely with each other.

That is, on the K-th valid subframe after receiving the M-PDCCH, transmission of the corresponding PDSCH may be performed by the base station (K=1, 2, or 3).

I-4. Timing of PUSCH

The LC device may assume that, transmission of the corresponding PUSCH starts by the LC device after K valid subframes satisfying a certain condition, after receiving the M-PDCCH. In this connection, the value of K may be 4 for transmission of the PUSCH.

For example, when transmission of the M-PDCCH from the base station is terminated on the subframe #n, and there are X invalid subframes until it is satisfied that there is the presence of K valid subframes after the subframe #n, transmission of the corresponding PUSCH may be initiated by the LC device from the subframe #n+X+K. In this connection, the value of K for the transmission of PUSCH may be 4. This will be described with reference to FIG. 14.

Figure 15A:
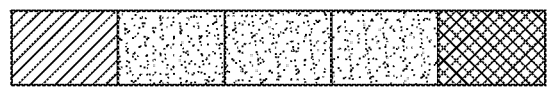
FIG. 15a and FIG. 15b show examples of PUSCH timing.
Figure 15A:
Figure 15A:
Figure 15A:
Figure 15A:
Figure 15B:
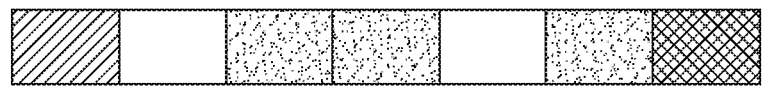

FIGS. 15a to 15b show examples of timing of the PUSCH.

For example, as shown in FIG. 15a, if K is 4, and there are four valid subframes immediately after the subframe corresponding to the M-PDCCH transmission termination point, transmission of the PUSCH may be started by the LC device on the fourth valid subframe.

Alternatively, when at least one invalid subframe exists, as shown in FIG. 15b, transmission of the PUSCH may be triggered by the LC device when it is satisfied that four valid subframes are present except for the at least one invalid subframe.

When K subframes contains only valid subframes satisfying specific conditions, such a valid subframe may be as follows. In this connection, the valid subframe may be defined to satisfy all or some of the following conditions:

i) Subframes not used as gap subframe (or switching subframe) for frequency hopping (or subband hopping) or for frequency retuning, or otherwise, subframes not configured as a gap subframe by the network or base station for the frequency retuning. In this connection, a gap subframe to be newly generated for receiving a PDSCH on a different subband according to cross-subband scheduling may not be included in the invalid subframe.

ii) In the case of HD-FDD, a subframe that is not used as a gap or guard subframe for switching from uplink to downlink or for switching from downlink to uplink In the case of downlink scheduling, such a subframe may only refer to subframes that are not used as gap subframes for switching from uplink to downlink Alternatively, in the case of uplink scheduling, such a subframe may only mean a subframe that is not used as a gap subframe for switching from downlink to uplink.

iii) In the case of TDD, a subframe that is not a DL subframe iv) In the case of TDD, a subframe other than the special subframe, v) In the case of DDD, a UL subframe vi) In the case of HD-FDD, a subframe not used for DL transmission vii) A subframe on which the cell-common PDSCH is not received, or a subframe on which the LC device does not expect to receive the cell-common PDSCH, or a subframe in which the LC device does not receive the cell-common PDSCH viii) A subframe other than a MBSFN subframe ix) A subframe configured as a subframe on which the LC device may transmit uplink data and/or uplink control channels.

x) A subframe other than a subframe on which transmission of PSS/SSS/PBCH occurs, when the PRB region for transmission of PSS/SSS/PBCH by the base station and the region of PRB resource for transmission of M-PDCCH and/or PDSCH by the base station are partially or entirely overlapped with each other xi) A subframe other than a subframe for transmission of PSS/SSS/PBCH, when the PRB region for transmission of PSS/SSS/PBCH by the base station and the region of PRB resource included in a subband for transmission of M-PDCCH and/or PDSCH are overlapped partially or entirely with each other.

That is, on the K-th valid subframe after receiving the M-PDCCH, reception of the corresponding PDSCH may be performed by the LC device (K=4).

On the other hand, if the base station may transmit the uplink grant on the downlink subframe at the same time as the uplink subframe on which the LC device cannot transmit the uplink, a problem may arise. For example, when, on the downlink subframe #n and the downlink subframe n+1, each uplink grant is received, and if the uplink subframe #n+1 is an invalid subframe for an uplink, two PUSCHs for two uplink grants must all be transmitted on the same uplink subframe. This may be a problem. To solve this problem, the applicants propose the following method.

i) (For FDD) The valid subframe considered when transmitting the uplink channel (for example, PUSCH, PUCCH) may be identical with the valid subframe considered when transmitting downlink channel (for example, M-PDCCH, PDSCH, PHICH).

ii) (For FDD) The valid subframe considered when transmitting downlink channels (for example, M-PDCCH, PDSCH, PHICH) may be a subset of valid subframes considered when the LC device transmits uplink channels (for example, PUSCH, PUCCH).

iii) The gap subframe for switching the downlink subband and the gap subframe for switching the uplink subband may be the same subframe.

iv) (In FDD environment), it is suggested that the LC device does not receive an uplink grant On an invalid uplink subframe.

v) (In the FDD environment) it is suggested that, on the uplink invalid subframe, the LC device does not receive the M-PDCCH.

vi) (In an FDD environment), it is suggested that the LC device assumes that an uplink invalid subframe is always a downlink invalid subframe.

vii) When the PUSCHs scheduled by a plurality of uplink grants are transmitted on the same subframe, the LC device determines that only an uplink grant received first (or most recently received) is valid and transmits the PUSCH scheduled by the corresponding uplink grant. Transmission of the PUSCHs scheduled by the remaining uplink grants is dropped.

Meanwhile, K may be determined according to the TDD PUSCH timing, and/or the valid subframe may be configured as a subframe that is not used as a gap subframe. If the LC device is scheduled to be downlinked and/or uplinked on n+1 and n+2 or consecutive subframes (the corresponding downlink and uplink may include PHICH PUCCH), and further, of the two subbands are different, the LC device may drop downlink reception or uplink transmission on the n+2 subframe. Alternatively, the LC device may delay the n+2 subframe. However, this delay may be performed only when the network or base station explicitly configures this delay, or only in the case of the downlink reception.

I-5. Timing of PUCCH

The LC device may assume that, transmission of the corresponding PUCCH including ACK/NACK for the PDSCH reception starts by the LC device after K valid subframes satisfying a certain condition, after receiving the PDCCH. In this connection, the value of K may be 4 for transmission of the PUCCH.

For example, when transmission of the PDCCH from the base station is terminated on the subframe #n, and there are X invalid subframes until it is satisfied that there is the presence of K valid subframes after the subframe #n, transmission of the corresponding PUCCH may be initiated by the LC device from the subframe #n+X+K. In this connection, the value of K for the transmission of PUCCH may be 4.

When K subframes contains only valid subframes satisfying specific conditions, such a valid subframe may be as follows. In this connection, the valid subframe may be defined to satisfy all or some of the following conditions:

i) Subframes not used as gap subframe (or switching subframe) for frequency hopping (or subband hopping) or for frequency retuning, or otherwise, subframes not configured as a gap subframe by the network or base station for the frequency retuning. In this connection, a gap subframe to be newly generated for receiving a PDSCH on a different subband according to cross-subband scheduling may not be included in the invalid subframe.

ii) In the case of HD-FDD, a subframe that is not used as a gap or guard subframe for switching from uplink to downlink or for switching from downlink to uplink In the case of downlink scheduling, such a subframe may only refer to subframes that are not used as gap subframes for switching from uplink to downlink Alternatively, in the case of uplink scheduling, such a subframe may only mean a subframe that is not used as a gap subframe for switching from downlink to uplink.

(iii) In the case of TDD, a subframe that is not a DL subframe (iv) In the case of TDD, a subframe other than the special subframe, v) In the case of DDD, a UL subframe vi) In the case of HD-FDD, a subframe not used for DL transmission vii) A subframe on which the cell-common PDSCH is not received, or a subframe on which the LC device does not expect to receive the cell-common PDSCH, or a subframe in which the LC device does not receive the cell-common PDSCH viii) A subframe other than a MBSFN subframe ix) A subframe configured as a subframe on which the LC device may transmit uplink data and/or uplink control channels.

x) A subframe on which PUSCH is not transmitted (when ACK/NACK is not transmitted using PUSCH)

xi) A subframe other than a subframe on which transmission of PSS/SSS/PBCH occurs, when the PRB region for transmission of PSS/SSS/PBCH by the base station and the region of PRB resource for transmission of M-PDCCH and/or PDSCH by the base station are partially or entirely overlapped with each other xii) A subframe other than a subframe for transmission of PSS/SSS/PBCH, when the PRB region for transmission of PSS/SSS/PBCH by the base station and the region of PRB resource included in a subband for transmission of M-PDCCH and/or PDSCH are overlapped partially or entirely with each other.

That is, on the K-th valid subframe after receiving the PDSCH, transmission of the corresponding PUcCH may be performed by the LC device (K=4).

I-6. PHICH (or ACK/NACK for PUSCH)

The LC device may assume that, transmission of the corresponding PHICH including ACK/NACK for the PUSCH transmission starts by the base station after K valid subframes satisfying a certain condition, after transmitting the PUSCH. In this connection, the value of K may be 4 for transmission of the PHICH.

For example, when transmission of the PUSCH from the LC device is terminated on the subframe #n, and there are X invalid subframes until it is satisfied that there is the presence of K valid subframes after the subframe #n, transmission of the corresponding PHICH may be initiated by the base station from the subframe #n+X+K. In this connection, the value of K for the transmission of PHICH may be 4.

When K subframes contains only valid subframes satisfying specific conditions, such a valid subframe may be as follows. In this connection, the valid subframe may be defined to satisfy all or some of the following conditions:

i) Subframes not used as gap subframe (or switching subframe) for frequency hopping (or subband hopping) or for frequency retuning, or otherwise, subframes not configured as a gap subframe by the network or base station for the frequency retuning. In this connection, a gap subframe to be newly generated for receiving a PDSCH on a different subband according to cross-subband scheduling may not be included in the invalid subframe.

ii) In the case of HD-FDD, a subframe that is not used as a gap or guard subframe for switching from uplink to downlink or for switching from downlink to uplink In the case of downlink scheduling, such a subframe may only refer to subframes that are not used as gap subframes for switching from uplink to downlink Alternatively, in the case of uplink scheduling, such a subframe may only mean a subframe that is not used as a gap subframe for switching from downlink to uplink.

(iii) In the case of TDD, a subframe that is not a UL subframe (iv) In the case of TDD, a subframe other than the special subframe, or a subframe other than the special subframe when the length of the DwPTS is less than or equal to x v) In case of TDD, a subframe configured as a DL subframe vi) In the case of HD-FDD, a subframe not used for uplink transmission vii) A subframe on which the cell-common PDSCH is not transmitted, or a subframe on which the LC device does not expect to receive the cell-common PDSCH, or a subframe in which the LC device does not receive the cell-common PDSCH viii) A subframe other than a MBSFN subframe xi) A subframe configured as a subframe on which the LC device may receive downlink data and/or downlink control channels.

x) A subframe that is not a subframe after receiving M-PDCCH xi) A subframe other than a subframe on which transmission of PSS/SSS/PBCH occurs, when the PRB region for transmission of PSS/SSS/PBCH by the base station and the region of PRB resource for transmission of M-PDCCH and/or PDSCH by the base station are partially or entirely overlapped with each other xii) A subframe other than a subframe for transmission of PSS/SSS/PBCH, when the PRB region for transmission of PSS/SSS/PBCH and the region of PRB resource included in a subband for transmission of M-PDCCH and/or PDSCH for operation of the LC device are overlapped partially or entirely with each other.

That is, on the K-th valid subframe after the LC device has transmitted the PUSCH, transmission of the corresponding PHICH may be performed by the base station (K=4).

Meanwhile, if the position of the subband or frequency is dynamically changed via the DCI, a subframe (that is, a subframe between a subframe corresponding to the DCI transmission termination and then a subframe for transmission of the corresponding PDSCH (PUSCH)) after a subframe corresponding to the DCI transmission termination by the base station may be assumed always as an invalid subframe by the LC device, and, thus, the LC device may not monitor such an invalid subframe. Alternatively, the LC device may assume that only scheduling on this subframe is not performed, and the LC device may use this subframe for a measurement purpose. Further, it may be assumed that such a subframe may not be used for UL scheduling or may not be used for downlink scheduling or data transmission.

II. Second Embodiment of the Present Disclosure: Number of Repetitions of Transmission of M-PDCCH and PDSCH II-1. How to count the number of repetitions of transmission For LC devices with coverage enhancement (CE) configuration, when the base station repeats the transmission of M-PDCCH/PDSCH/PHICH (ACK/NACK for PUSCH) N times, transmission of M-PDCCH/PDSCH/PHICH (ACK/NACK for PUSCH) may be done over the N valid subframes. In this connection, the valid subframes may be the same as the valid subframes defined for transmission of the PDSCH in the previous first embodiment I.

Transmission of M-PDCCH/PDSCH/PHICH (ACK/NACK for PUSCH) may be performed over a total of N subframes from a subframe #n to a subframe #n+N−1. In this connection, iterative transmission of M-PDCCH/PDSCH/PHICH (ACK/NACK for PUSCH) may be performed only on valid subframes among a total of N subframes from subframe #n to subframe #n+N−1.

Further, among the subframes on which the M-PDCCH/PDSCH is received by the LC device, there may be a subframe on which the LC device must receive the SIB. In this case, in this embodiment, the base station may be configured to transmit only one of the SIB and the M-PDCCH/PDSCH using the corresponding resource. In this manner, when a SIB transmission resource and an M-PDCCH/PDSCH transmission resource are overlapped with each other, this embodiment proposes that the base station transmits an M-PDCCH/PDSCH while the LC device operate as follows.

As a first suggestion, both the base station and the LC device may assume that subframes for SIB transmission are not used for transmission of M-PDCCH/PDSCH. Similarly, the LC device may assume that the subframes on which the SIB is received are not used for reception of the M-PDCCH/PDSCH. Further, the subframe on which the SIB is transmitted refers to a resource position of a subframe on which the SIB 1 is transmitted as determined via the standard specification or MIB configuration, and resource positions of subframes for transmission of other SIBs as informed via the SIB. In this connection, these subframes may be counted into the number of repetitive transmissions of the M-PDCCH/PDSCH. That is, it may be assumed that when SIB is transmitted on the subframe where transmission (that is, repetitive transmission) of the n-th M-PDCCH/PDSCH is to be performed, transmission (repetition) of the n+1-th M-PDCCH/PDSCH occurs on a next subframe.

As a second suggestion, both the base station and the LC device may assume that subframes for SIB transmission are not used for transmission of M-PDCCH/PDSCH. Further, the subframe on which the SIB is transmitted refers to a resource position of a subframe on which the SIB 1 is transmitted as determined via the standard specification or MIB configuration, and resource positions of subframes for transmission of other SIBs as informed via the SIB. In this connection, these subframes may not be counted into the number of repetitive transmissions of the M-PDCCH/PDSCH. That is, it may be assumed that when SIB is transmitted on the subframe where transmission (that is, repetitive transmission) of the n-th M-PDCCH/PDSCH is to be performed, transmission (repetition) of the n-th M-PDCCH/PDSCH occurs on a next subframe.

As a third suggestion, both the base station and the LC device may assume that subframes for SIB1 transmission are not used for transmission of M-PDCCH/PDSCH. In this connection, the subframe on which the SIB1 is transmitted refers to a resource position of a subframe on which the SIB 1 is transmitted as determined via the standard specification or MIB configuration. In this connection, these subframes may not be counted into the number of repetitive transmissions of the M-PDCCH/PDSCH. That is, it may be assumed that when SIB is transmitted on the subframe where transmission (that is, repetitive transmission) of the n-th M-PDCCH/PDSCH is to be performed, transmission (repetition) of the n-th M-PDCCH/PDSCH occurs on a next subframe. However, on the subframes where SIBs other than SIB1 are transmitted, the corresponding subframe is not used for transmission of the M-PDCCH/PDSCH. However, such a subframe may be counted in the number of repetitions of transmission of the M-PDCCH/PDSCH. That is, it may be assumed that when the SIB is transmitted on the subframe on which the n-th M-PDCCH/PDSCH transmission (repetition) should occur, transmission (repetition) of n+1-th M-PDCCH/PDSCH occurs in a next subframe.

As a fourth suggestion, both the base station and the LC device may assume that subframes for SIB1 and SIB2 transmission are not used for transmission of M-PDCCH/PDSCH. In this connection, the subframe on which the SIB1 is transmitted refers to a resource position of a subframe on which the SIB 1 is transmitted as determined via the standard specification or MIB configuration. The subframe on which the SIB2 is transmitted refers to a resource position of a subframe on which the SIB 2 is transmitted as indicated via the SIB1. In this connection, these subframes may not be counted into the number of repetitive transmissions of the M-PDCCH/PDSCH. That is, it may be assumed that when SIB is transmitted on the subframe where transmission (that is, repetitive transmission) of the n-th M-PDCCH/PDSCH is to be performed, transmission (repetition) of the n-th M-PDCCH/PDSCH occurs on a next subframe. Further, on the subframes where SIBs other than SIB1 and SIB2 are transmitted, the corresponding subframe is not used for transmission of the M-PDCCH/PDSCH. However, such a subframe may be counted in the number of repetitions of transmission of the M-PDCCH/PDSCH. That is, it may be assumed that when the SIB is transmitted on the subframe on which the n-th M-PDCCH/PDSCH transmission (repetition) should occur, transmission (repetition) of n+1-th M-PDCCH/PDSCH occurs in a next subframe.

In this connection, when the transmission resource for the SIB and the transmission resource for the M-PDCCH/PDSCH overlap each other according to the CE mode, the M-PDCCH/PDSCH transmission and the operation of the LC device may be changed. Accordingly, different suggestions of the above suggestions may be applied to between the CE mode A and CE mode B. For example, in the case of the CE mode A, the M-PDCCH/PDSCH transmission and the operation of the LC device may be defined as in the second suggestion described above, while in the case of the CE mode B, the M-PDCCH/PDSCH transmission and the operation of the LC device may be defined as in the fourth suggestion described above. As an alternative, in the case of CE mode A, since there is a possibility that the base station perform scheduling to avoid a collision between the M-PDCCH/PDSCH transmission and the SIB transmission, the M-PDCCH/PDSCH transmission and the operation of the LC device may be defined as in the first suggestion described above. However, in the CE mode B, the transmission of the M-PDCCH/PDSCH and the operation of the LC device may be defined as in the fourth suggestion in consideration of a situation in which it is difficult to avoid collision between the M-PDCCH/PDSCH transmission and the SIB transmission.

In the case of HD-FDD, the above approach may be equally applied to transmission of PUCCH, PUSCH, and/or PRACH, and operation of the LC device when the transmission resource for the SIB collides with the transmission resource of an uplink channel such as PUCCH, PUSCH, and/or PRACH.

On the other hand, when a CRS-based transmission scheme is applied to the PDSCH transmission, the PDSCH may not be transmitted on the MBSFN subframe, even when some MBSFN subframes are configured by the MTC-SIB to be available. In this case, the MBSFN subframes configured as available by the MTC-SIB may not be counted in the number of repetitions of transmission of the PDSCH.

As a result, the following is proposed: if any subframes are configured by the MTC-SIB to be available for downlink transmission, the corresponding subframes may be counted in the number of repetitions of transmission of the M-PDCCH/PDSCH although the corresponding subframes are not used for M-PDCCH/PDSCH transmission. Further, the following is proposed: if any subframes are configured by the MTC-SIB to be available for uplink transmission, the corresponding subframes may be counted in the number of repetitions of transmission of the PUCCH/PUSCH although the corresponding subframes are not used for PUCCH/PUSCH transmission.

Further, for the LC device with the CE configuration, if the number of repetitive transmissions of the PUSCH is N, the transmission of PUSCH may be made over N valid subframes. In this connection, the valid subframes may be the same as the valid subframes defined for transmission of the PUSCH in the first embodiment I. For example, when PUSCH is transmitted over a total of N subframes from subframe #n to subframe #n+N−1, the repetitive transmission of the PUSCH may be performed only on valid subframes among a total of N subframes from subframe #n to subframe #n+N−1.

Further, for the LC device with the CE configuration, if the number of repetitive transmissions of the PUCCH is N, the transmission of PUCCH may be made over N valid subframes. In this connection, the valid subframes may be the same as the valid subframes defined for transmission of the PUCCH in the first embodiment I. For example, when PUCCH is transmitted over a total of N subframes from subframe #n to subframe #n+N−1, the repetitive transmission of the PUCCH may be performed only on valid subframes among a total of N subframes from subframe #n to subframe #n+N−1.

Further, a subframe included in the PRACH resource set available for the LC device to transmit PRACH may be present within the same subframe of the same subband for PUSCH/PUCCH transmission. In this connection, a PRACH resource set refers to a set of resources available for the LC device to transmit PRACH. This PRACH resource set may be independently configured based on the coverage enhancement level (CE level). In this case, a collision may occur between PUSCH/PUCCH transmission and PRACH transmission by different LC devices. Therefore, in order to prevent collision between the SIB transmission and the M-PDCCH/PDSCH transmission, the present embodiment suggests the PUSCH/PUCCH transmission and LC device's operation as follows.

As a first suggestion, subframes included in the PRACH resource set for all coverage enhancement levels (CE levels) may not be used for transmission of PUSCH/PUCCH. In this connection, these subframes may be counted in the number of transmission repetitions of the PUSCH/PUCCH. That is, when a subframe for the n-th transmission of the PUSCH/PUCCH is included in the PRACH resource set, it may be assumed that the n+1-th transmission of the PUSCH/PUCCH is performed on a next subframe.

As a second suggestion, subframes included in the PRACH resource set for all coverage enhancement levels (CE levels) may not be used for transmission of PUSCH/PUCCH. In this connection, these subframes may not be counted in the number of transmission repetitions of the PUSCH/PUCCH. That is, when a subframe for the n-th transmission of the PUSCH/PUCCH is included in the PRACH resource set, it may be assumed that the n-th transmission of the PUSCH/PUCCH is performed on a next subframe.

As a third suggestion, a subframe included in the PRACH resource set for the coverage enhancement level (CE level) currently configured for the LC device may not be used for transmission of the PUSCH/PUCCH. In this connection, the subframe may not be counted in the number of transmission repetitions of PUSCH/PUCCH. That is, when a subframe for the n-th transmission of the PUSCH/PUCCH is included in the PRACH resource set for the coverage enhancement level (CE level) currently configured for the LC device, it may be assumed that the LC device performs the n-th iterative transmission of the PUSCH/PUCCH on a next subframe.

In this connection, when resource overlap occurs between the transmission resource for PUSCH/PUCCH and the PRACH resource set according to CE mode, PUSCH/PUCCH transmission and the operation of the LC device may be changed. Therefore, different suggestions among the various suggestions may be applied to the CE mode A and CE mode B. For example, in the case of CE mode A, since the scheduling is likely to be performed by the base station so that resource collision between the PUSCH/PUCCH resource and the PRACH resource set does not occur, the LC device's operation and transmission of PUSCH/PUCCH may be applied according to the first suggestion. On the other hand, in CE mode B, since it is difficult to avoid resource collision between PUSCH/PUCCH resource and PRACH resource set, the LC device's operation and transmission of PUSCH/PUCCH may be applied according to the third suggestion.

In the case of HD-FDD, when there occurs transmission resource collision between transmission resource for downlink channel of M-PDCCH, PDSCH and the transmission resource in PRACH resource set, the above scheme may be equally applied to the M-PDCCH, PDSCH transmission and LC device's operation.

II-2. The Redundancy Version (RV)

The RV is used to indicate whether the corresponding transmission is re-transmission for HARQ.

Figure 16A:
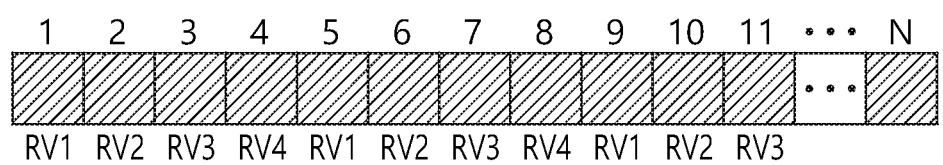
FIG. 16a and FIG. 16b illustrate the use of RV values in a bundle of subframes for repetitive transmission.
Figure 16B:
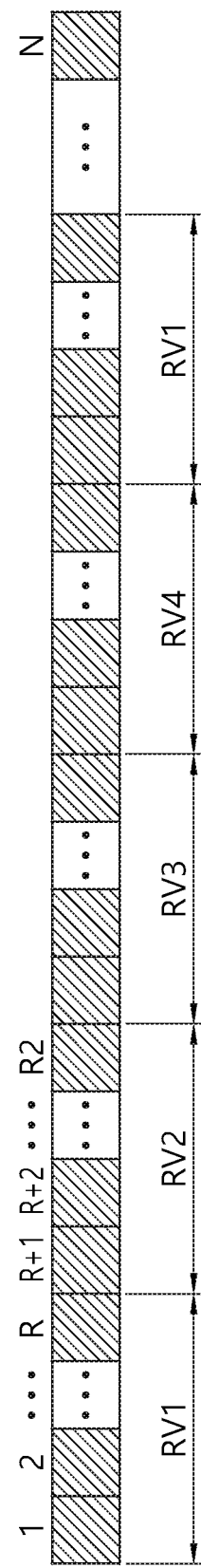

FIGS. 16a and 16b show examples of the use of RV values over the bundle of subframes for repeated transmission.

As shown in FIG. 16a, the RV values for the PDSCH/PUSCH repeatedly transmitted over the bundle of subframes may be configured so that four or more RV values may be sequentially used per each subframe.

Alternatively, as shown in FIG. 16b, the RV value for the PDSCH/PUSCH repeatedly transmitted over the bundle of subframes may be configured such that four or more RV values are changed every R subframes. In this connection, when the number of subframes to which the same RV value is applied is R, the value of R may be a predefined fixed value or a value configured by the base station.

If transmission of the PDSCH/PUSCH is transmitted over non-consecutive subframes due to the invalid subframe or the like, the RV value configuration may be made as follows.

According to a first option, the RV values may be changed/used based on the subframe indexes regardless of the presence or absence of the invalid subframe. That is, when data transmission starts from subframe #n, the value of the RV used for the subframe #n+k may be determined by the value of k. For example, when four RV values are sequentially used for each subframe as shown in FIG. 16a, and if the subframe #n+2 among the subframes #n to #n+6 is an invalid subframe, RV values used for data transmission over the subframes #n, #n+1, #n+3, #n+4, #n+5 and #n+6 may be RV1, RV2, RV4, RV1, RV2, and RV3 respectively.

According to the second option, the RV value may be determined by counting only the subframes for the actual data transmission. That is, when r-th iterative transmission is performed in a subframe #n+k, the value of RV used for the subframe #n+k may be determined by the r value. For example, when four RV values are sequentially used for each subframe as shown in FIG. 16a, and if the PDSCH/PUSCH is not transmitted on the subframe #n+2 among the subframes #n to #n+6, RV values used for data transmission over the subframes #n, #n+1, #n+3, #n+4, #n+5 and #n+6 may be RV1, RV2, RV3, RV4, RV1, and RV2 respectively.

According to the third option, the RV values may be determined by counting the valid subframes (or available subframes) configured via the SIB from the base station during transmission of the PDSCH/PUSCH. In this connection, even when the actual PDSCH/PUSCH is not transmitted on the valid subframe, the corresponding valid subframe may be counted to determine the RV value. For example, when four RV values are sequentially used for each subframe as shown in FIG. 16a, and if the subframe #n+2 among the subframes #n to #n+6 is an invalid subframe, RV values used for data transmission over the subframes #n, #n+1, #n+3, #n+4, #n+5 and #n+6 may be RV1, RV2, RV3, RV4, RV1, and RVv respectively.

III. Third Embodiment of the Present Disclosure: a Sub-Band Indication Considering Cross-Subframe Scheduling Since frequency (that is, subband) positions for transmission of a PDSCH (or PUSCH) scheduled by DL grants (or UL grants) transmitted over successive subframes are different, there may occur the situation where, when the LC device receives PDSCH (or transmits PUSCH), the complexity thereof increases or technological ambiguity occurs. In order to prevent this situation, the following approach may be suggested. This approach may be applied particularly to the case when the position of the PRB for transmission of the PDSCH (or PUSCH) is flexibly indicated in the entire system band via the DCI, or the case when the position of the subband for the PDSCH (or PUSCH) is indicated via the DCI.

The second DL grant transmitted between the time the base station transmits the first DL grant (for example, DL grant A) and the time the base station transmits the corresponding first PDSCH (for example, PDSCH A) PDSCH A) may indicate the same subband such that the second PDSCH (PDSCH B) is transmitted in the same subband as the subband for the transmission of the first PDSCH (PDSCH A) (such that frequency hopping or subband switching is not performed).

Alternatively, the second DL grant (that is, DL grant) transmitted between the time of transmitting the first DL grant (that is, DL grant A) by the base station and the time of transmitting the corresponding first PDSCH (that is, PDSCH A) B) by the base station may not indicate a subband for transmission of the corresponding second PDSCH (that is, PDSCH B). In this connection, the LC device may assume that the second PDSCH (that is, PDSCH B) is transmitted by the base station in the subband indicated by the first DL grant (that is, DL grant A).

On the other hand, the second UL grant (that is, UL grant B) transmitted by the base station, between the time that the base station transmits the first UL grant (that is, UL grant A) and the time that the LC device transmits the corresponding first PUSCH (that is, PUSCH A), may indicate the same subband so that the second PUSCH is transmitted in the same subband as the first PUSCH (that is, such that the LC device does not need to perform frequency hopping or subband switching). Alternatively, the second UL grant (that is, UL grant B) transmitted by the base station, between the time that the base station transmits the first UL grant (that is, UL grant A) and the time that the LC device transmits the corresponding first PUSCH (that is, PUSCH A), may not indicate a subband for transmission of the corresponding second PUSCH (that is, PUSCH B). In this connection, the LC device may assume that it should transmit the second PUSCH (that is, PUSCH B) in the subband indicated by the first UL grant (UL grant A).

IV. Fourth Embodiment of the Present Disclosure: Supporting Multiple HARQ Operations If the LC device continuously receives cross-subband scheduling (or cross-carrier scheduling), timing problems may occur in the following situations: For example, when, in two consecutive downlinks in a first subband, a PDSCH are scheduled in a different second subband, the problem may occur or not depending on whether or not the corresponding downlink scheduling is well received, even though only valid downlinks has been counted. To solve this problem, a field such as DAI in the DCI may be utilized.

Figure 17:
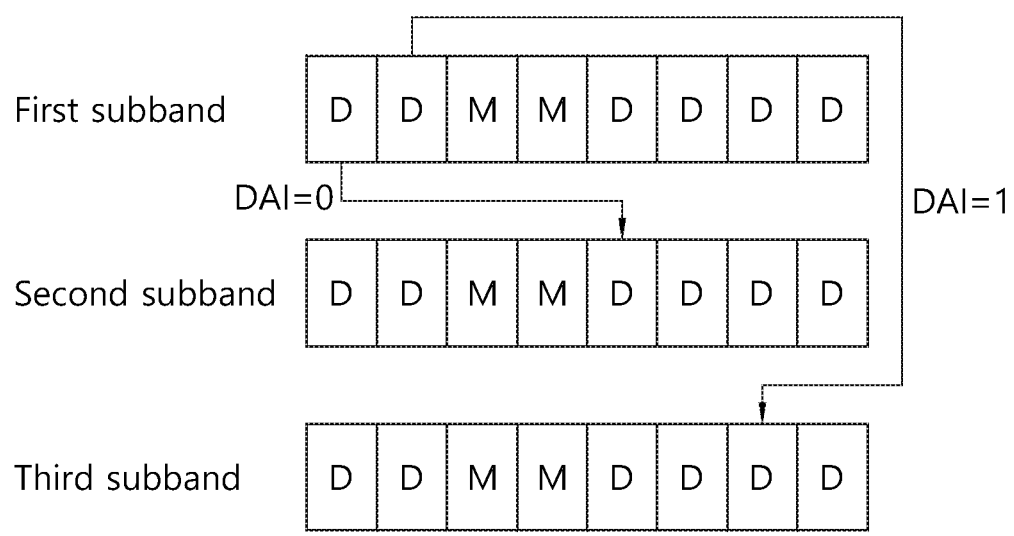
FIG. 17 shows an example of using DAI in DCI in cross-subband scheduling.

FIG. 17 shows an example of using DAI in DCI for cross-subband scheduling.

In order to solve the above-mentioned problem, it is possible to pre-specify that the PDSCH is scheduled at n+X+k+DAI (or n+k+DAI) using a field such as DAI at the time of scheduling. Alternatively, DAI may tell how many new HARQ processes has been scheduled simultaneously up to now or how many new HARQ processes has been continuously scheduled up to now.

V. Fifth Embodiment of the Present Disclosure: Cross-Subband Scheduling

The base station may also perform cross-subband scheduling of data channels such as PDSCH or PUSCH. This will be described with reference to FIG. 18.

Figure 18:
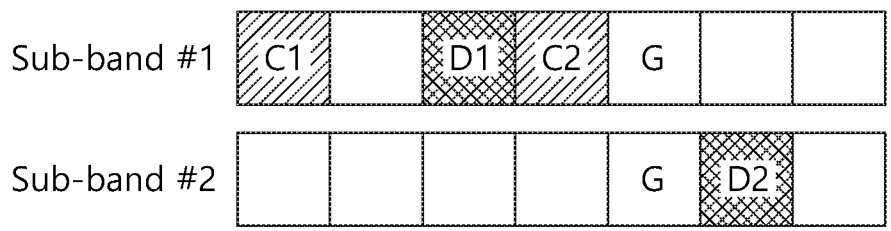
FIG. 18 shows an example of cross-subband scheduling.

FIG. 18 shows an example of cross-subband scheduling.

As shown in FIG. 18, the base station may schedule PDSCH or PUSCH transmission on different subbands when scheduling via a control channel such as an M-PDCCH. For example, if the data channel scheduled by the control channel Cm is Dm, the control channel C1 may schedule transmission of data channel D1 on the same subband and the control channel C2 may schedule transmission of data channel D2 on a different subband. In this connection, the LC device does not perform subband switching to receive data channel D1, so that the previous subframe of the data channel D1 is not used as a gap subframe. However, since the LC device must perform subband switching to receive the data channel D2, the previous subframe of the data channel D2 is used as a gap subframe. In this connection, the gap subframe may be an invalid subframe on which another data channel/control channel may be received.

The present embodiment suggests methods for preventing/solving collision between two PDSCH transmissions when performing cross-subband scheduling. Although the downlink grant and the corresponding PDSCH are mainly referred to in the present embodiment, the present embodiment may be applied to uplink grant and its corresponding PUSCH, transmission of the PUSCH, transmission of the PHICH including the corresponding HARQ ACK/NACK, transmission of the PDSCH, and PUCCH including its corresponding HARQ ACK/NACK.

V-1. Fixed Timing

When the LC device receives a control channel (downlink grant) on the subframe #n, the LC device may perform reception of the corresponding PDSCH on the subframe #n+K (for example, K=2).

Figure 19:
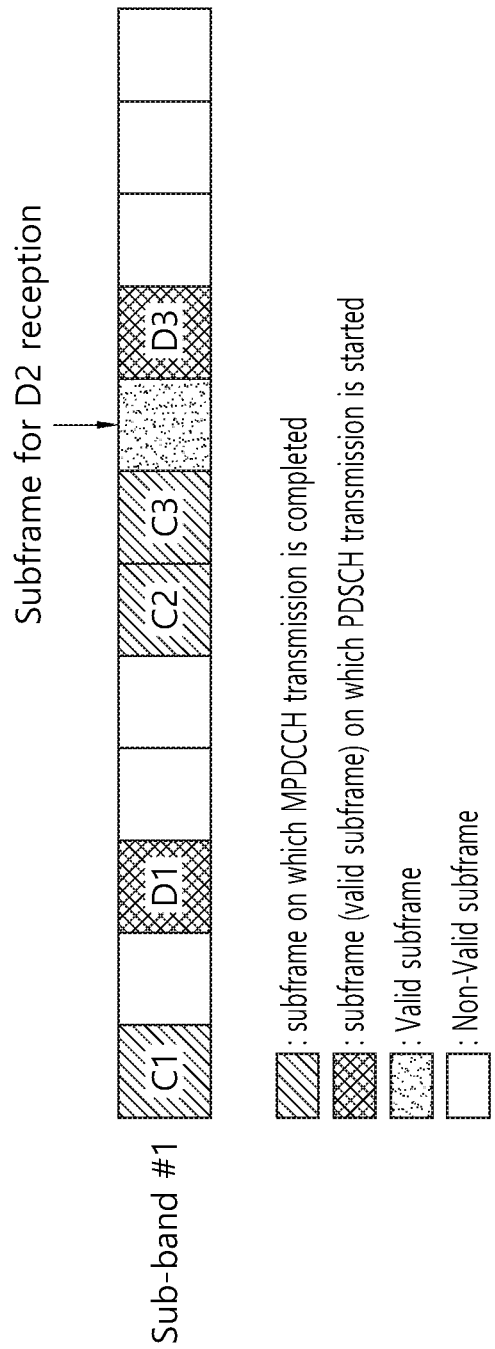
FIG. 19 shows an example of self-subband scheduling.

FIG. 19 shows an example of self-subband scheduling.

As shown in FIG. 19, when self-subband scheduling is performed, control channel (downlink grant) C2 is received on subframe #n, the subframe #n+2 used to receive the data channel D2 may be designated as an invalid subframe, or may not be designated as a valid subframe, and thus may be regarded as an invalid subframe. If the LC device receives the downlink grant one subframe #n, but the subframe #n+2 is specified as an invalid subframe or is not specified as a valid subframe and thus is considered an invalid subframe, the LC device may drop the reception of the corresponding PDSCH and may not perform the reception of the corresponding PDSCH. To the contrary, when another control channel C3 is transmitted on the subframe #n+1, the LC device does not receive the data channel D2 in the subframe #n+2, but may receive data channel D3 on the subframe #n+3 since the subframe #n+3 is not an invalid subframe.

On the other hand, as described in the above Section I-1, the gap subframe is considered a valid subframe, but may be treated as an invalid subframe, as described in the above Section I-2. Accordingly, the operations of the LC device on the gap subframe will be described with reference to FIGS. 20A and 20B.

Figure 20A:
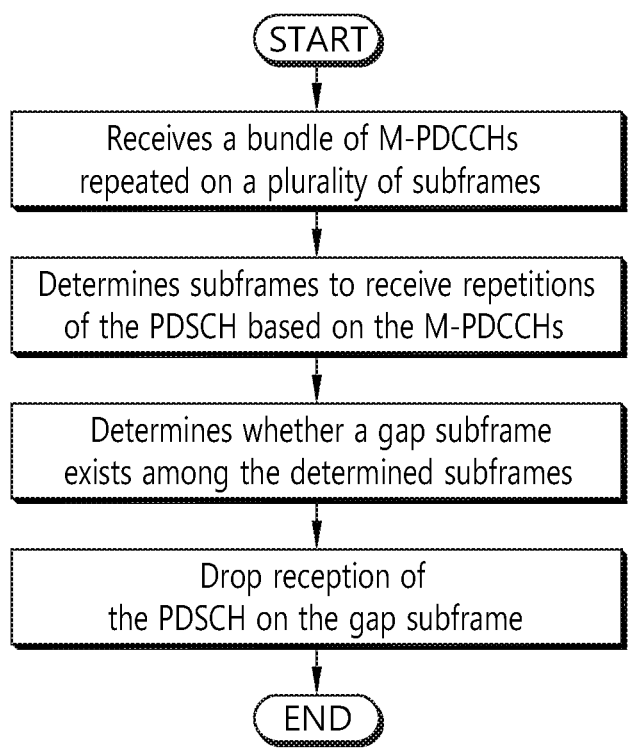
FIG. 20A shows PDSCH reception operation of an LC device on a gap subframe.

FIG. 20A shows a PDSCH reception operation of an LC device on a gap subframe.

First, when a coverage enhancement (CE) is configured for an LC device, the LC device receives a bundle of repetitive M-PDCCHs on a plurality of subframes.

Further, the LC device determines subframes to be used to repeatedly receive the PDSCH based on the M-PDCCHs.

The LC device determines whether a gap subframe exists among the determined subframes.

If so, the LC device may drop reception of the PDSCH on the gap subframe.

On the other hand, when the number of reception iterations of the PDSCH is N in the II-1 section, the N means the number of valid subframes. Therefore, even if the gap subframe on which PDSCH reception is abandoned is treated as an invalid subframe, but if the gap subframe is designated as a valid subframe, the gap subframe may be counted in the repetition number N.

The above-described scheme may be applied to the transmission of the PUSCH. This will be explained as follows with reference to FIG. 20B.

Figure 20B:
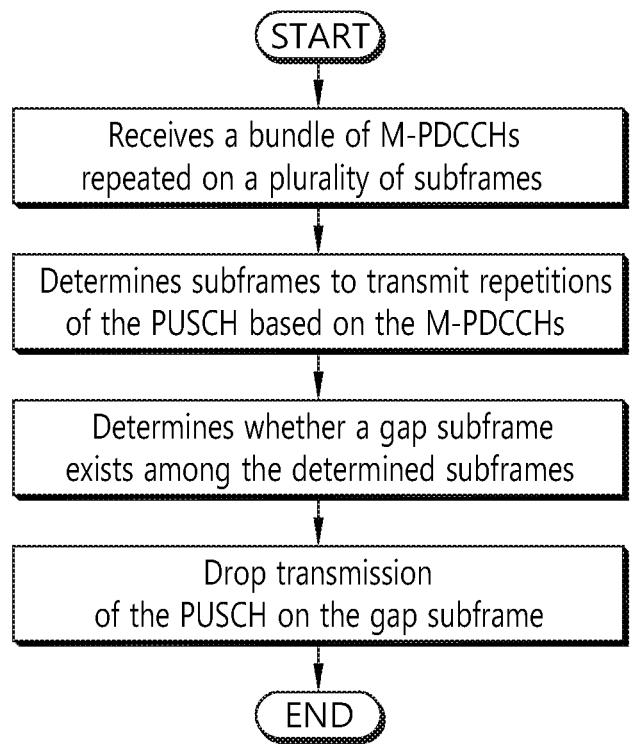
FIG. 20B shows a PUSCH transmission operation of an LC device on a gap subframe.

FIG. 20B shows a PUSCH transmission operation of an LC device on a gap subframe.

First, when a coverage enhancement (CE) is configured for an LC device, the LC device receives a bundle of repetitive M-PDCCHs over a plurality of subframes.

Further, the LC device determines subframes to be used to repeatedly transmit the PUSCH based on the M-PDCCHs.

The LC device determines whether a gap subframe exists among the determined subframes.

If so, the LC device may drop transmission of the PUSCH on the gap subframe.

On the other hand, when the number of transmission iterations of the PUSCH is N in the II-1 section, the N means the number of valid subframes. Therefore, even if the gap subframe on which PUSCH transmission is abandoned is treated as an invalid subframe, but if the gap subframe is designated as a valid subframe, the gap subframe may be counted in the repetition number N.

Figure 21A:
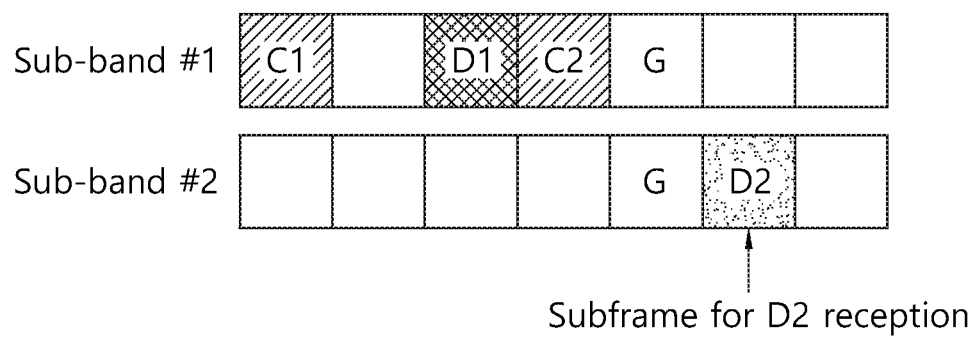
FIGS. 21A and 21B show examples of cross-subband scheduling.
Figure 21B:
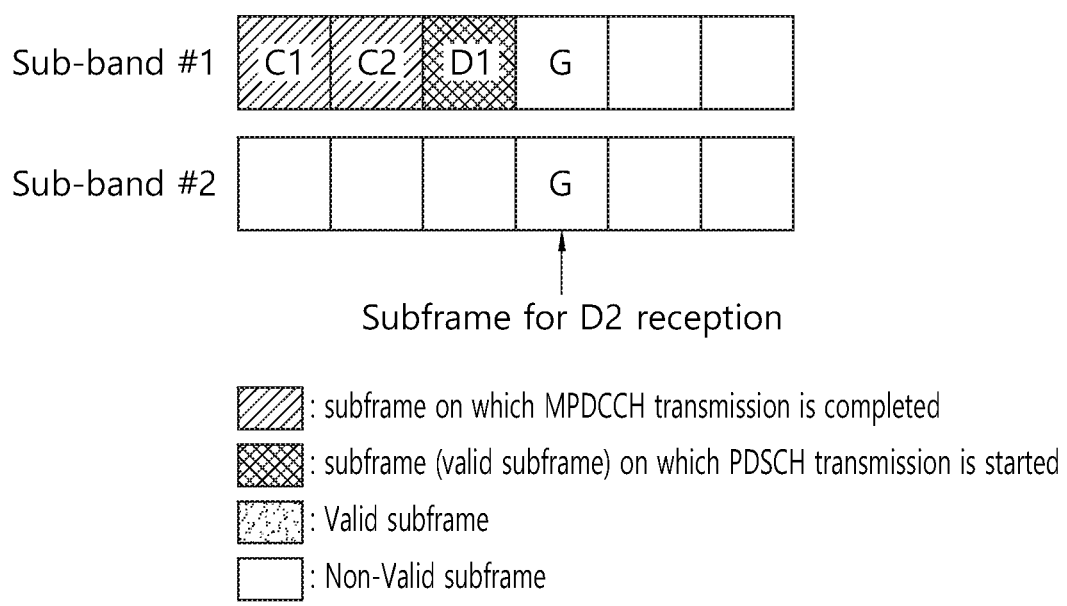

FIG. 21A and FIG. 21B show examples of cross-subband scheduling.

Meanwhile, when considering cross-subband scheduling, as shown in FIG. 21A, the LC device intends to receive control channel C2 on subframe #n, and to receive PDSCH data channel D2 on subframe #n+2. However, the subframe #n+2 as the corresponding subframe may be designated as an invalid subframe. In this case, as described above, when downlink grant is received on subframe #n, but the subframe #n+2 is configured as an invalid subframe, the LC device may drop the reception of the corresponding PDSCH and may not perform the reception of the corresponding PDSCH.

As another example, when the base station transmits a downlink grant C1 on a subframe #n and the downlink grant C1 performs self-subband scheduling, as shown in FIG. 21B, the LC device may receive data channel D2 as the corresponding PDSCH on subframe #n+2 without subband switching. In this case, the LC device may receive another downlink grant C2 on subframe #n+1. In this connection, the LC device may receive the PDSCH data channel D1 on subframe #n+2, and receive the PDSCH as a data channel D2 on subframe #n+3. However, there arises a problem that a gap subframe used for performing the subband switching cannot be configured between a subframe used for receiving data channel D1 and a subframe used for receiving data channel D2. In such a case, in order to solve this problem, the operation of the LC device or a method for preventing such a case may be performed as follows.

i) In this case, the LC device gives priority to reception of the first scheduled data channel D1, and receives data channel D1 on subframe #n+2, and thus drops reception of data channel D2 on subframe #n+3, and does not receive the PDSCH on subframe #n+3. As an alternative, the LC device prioritizes reception of the most recently scheduled data channel D2, and performs subband switching using subframe #n+2 as a gap subframe, and receives data channel D2 on subframe #n+3.

ii) The base station sends a downlink grant, and, then, the next downlink grant may not be transmitted until transmission of the corresponding data channel is performed (for example, the number of HARQ process=1)

iii) The base station sends a first downlink grant, and a second downlink grant transmitted before transmitting the corresponding data channel D1 may schedule the PDSCH transmission only in the same subband as the subband for transmission of the data channel D1.

V-2. Delay Timing (First Valid Subframe)

When the LC device receives a control channel (downlink grant) on subframe #n, the LC device may perform reception of the corresponding PDSCH on the first valid subframe among the subframes after a subframe #n+K (for example, K=2). In this connection, a gap subframe to be newly generated for receiving PDSCH according to cross-subband scheduling may not be included in an invalid subframe.

Figure 22:
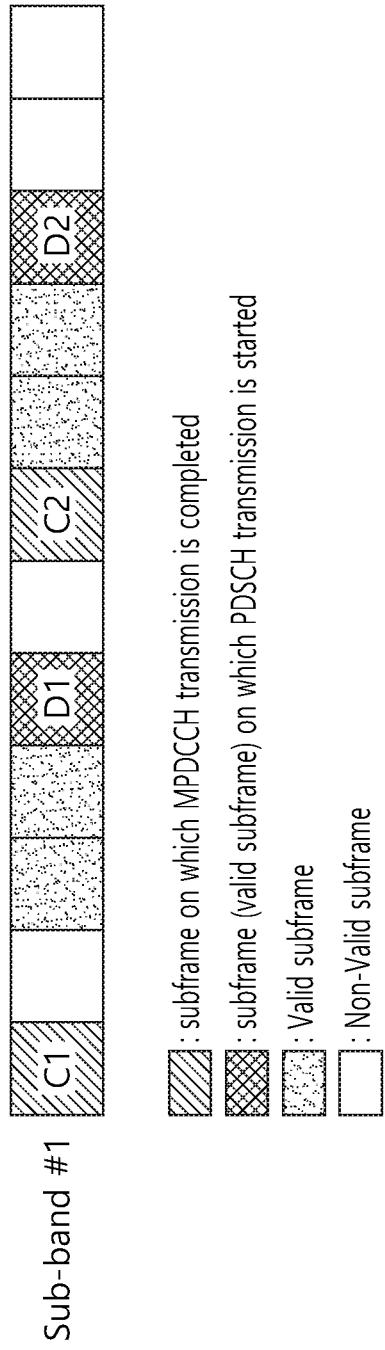
FIG. 22 shows an example of receiving a PDSCH on a first valid subframe.

FIG. 22 shows an example of receiving a PDSCH on a first valid subframe.

Referring to 22, when the LC device receives the downlink grant C1 on the subframe #n and the subframes #n+2 and #n+3 are the invalid subframes, the LC device may receive the PDSCH data channel D1 on subframe #n+4 as the first valid subframe after the subframe #n+2.

Figure 23A:
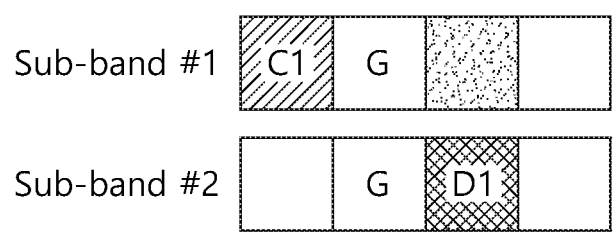
FIGS. 23A and 23B show another example of receiving a PDSCH on a first valid subframe.
Figure 23A:
Figure 23A:
Figure 23A:
Figure 23A:
Figure 23B:
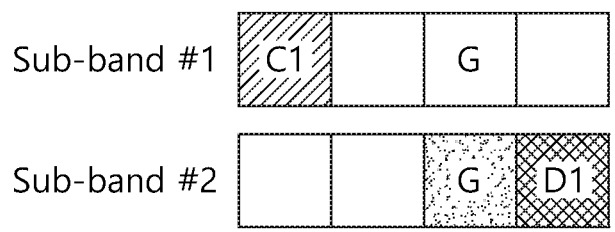
Figure 23B:
Figure 23B:
Figure 23B:
Figure 23B:

FIG. 23A and FIG. 23B show another examples of receiving the PDSCH on the first valid subframe.

Referring to 23A, when cross-subband scheduling is used, when a control channel is transmitted on subband #1, and a subband used for transmission of the corresponding PDSCH is subband #2, the LC device may determine the position of the subframe used to receive the PDSCH based on the subband using which the control channel is received. However, in this case, due to the presence of the valid subframe in subband #1, the subframe that is determined to be able to be used to receive the PDSCH may become an invalid subframe in subband #2, and may not be used to receive the PDSCH. In this case, the LC device may operate as follows.

The subframe determined to be able to be use to receive the PDSCH based on the subband using which the DL grant is received becomes an invalid subframe in the subband using which the actual PDSCH should be received and, thus, the PDSCH may not be received, the LC device may drop the reception of the corresponding PDSCH and may not perform the reception of the corresponding PDSCH.

In the case of performing cross-subband scheduling, as shown in FIG. 23A, when a control channel is transmitted using subband #1 and a subband for transmission of a corresponding PDSCH is subband #2, the LC device may consider an invalid subframe based on the subband to be used to receive the data channel. For example, as shown in FIG. 23A, when a downlink grant is received on subframe #n, the subframe #n+2 is a valid subframe in subband #2 to be used to receive the PDSCH, even though the subframe #n+2 is an invalid subframe in subband #1. Thus, the PDSCH may be received on the subframe #n+2.

On the other hand, as shown in FIG. 23B, when a downlink grant is received on subframe #n, since subframe #n+2 is an invalid subframe in subband #2, the corresponding PDSCH may be received on subframe #n+3 as the closest valid subframe thereafter.

Figure 24A:
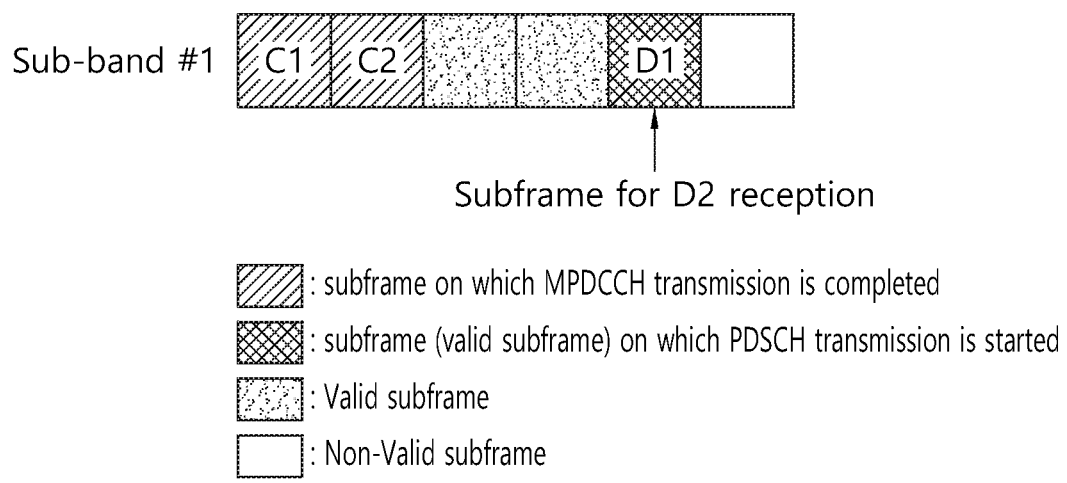
FIGS. 24A to 24C show another example of receiving a PDSCH on a first valid subframe.
Figure 24B:
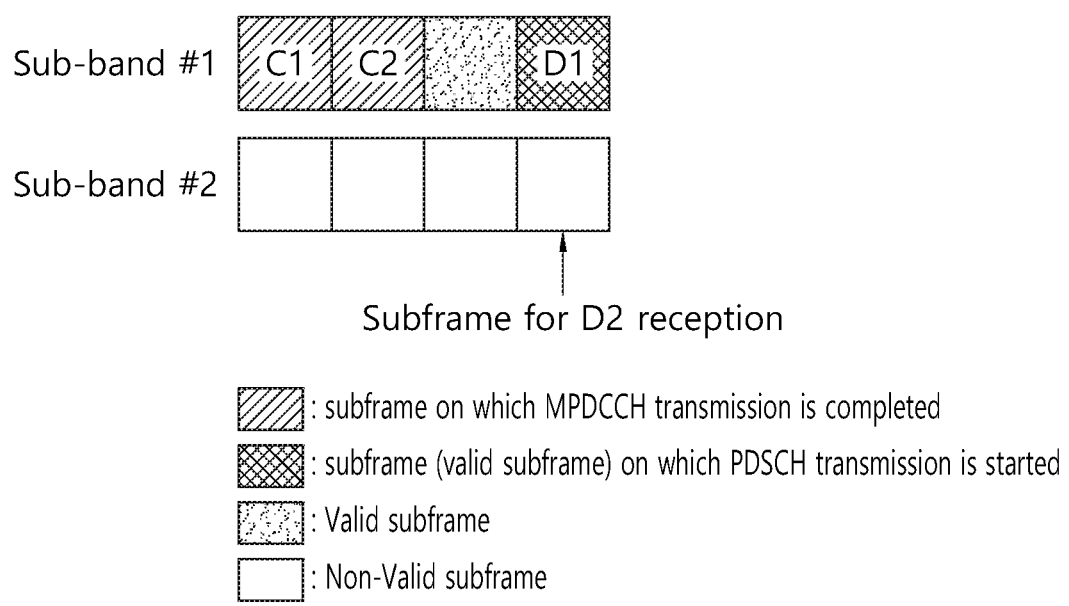
Figure 24C:
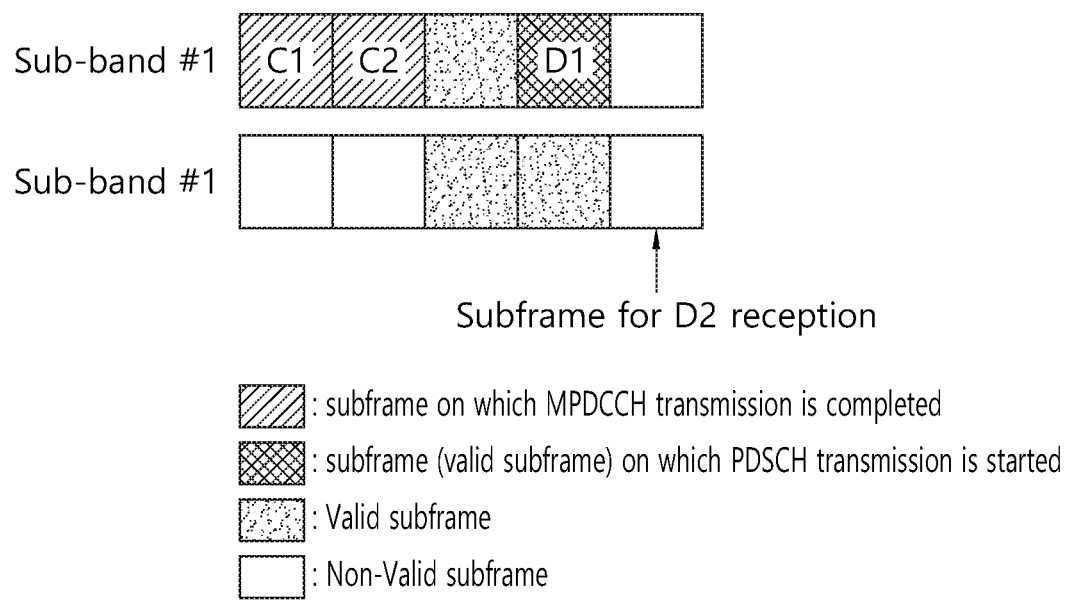

FIG. 24A to FIG. 24C show another examples of receiving the PDSCH on the first valid subframe.

when an LC device determines an invalid subframe based on a subband to be used to receive a data channel (determines a subband to be used to receive a PDSCH), the subframes to be used to receive the PDSCHs scheduled by the two downlink grants C1 and C2 received on the different subframes may be the same subframe, as shown in FIGS. 24A and 24B. This is problematic. That is, the subframe overlapping may occur. Alternatively, as shown in FIG. 24C, the subframes to be used to receive the PDSCHs scheduled by the two downlink grants C1 and C2 received on the different subframes are positioned in different subbands, and, thus, the PDSCHs may be received on two consecutive subframes. In this case, a gap-subframe (or a guard subframe) used for switching the subband cannot be generated. In this case, the LC device' operation and/or a method for preventing such a case may be as follows.

i) The LC device gives priority to reception of the first PDSCH (for example, data channel D1) scheduled for the first time, and receives the data channel D1, and drops the reception of the second PDSCH (for example, data channel D2) and does not receive the second PDSCH (for example, data channel D2). Alternatively, the LC device prioritizes reception of the most recently scheduled PDSCH (for example, data channel D2) and drops reception of the first PDSCH (for example, the data channel D1), and the LC device uses the previous subframe on which the data channel D2 is received as a gap (gap) subframe to perform subband switching, and, thus, performs reception of the data channel D2.

ii) The base station sends a downlink grant, and, then, the next downlink grant may not be transmitted until transmission of the corresponding data channel (PDSCH) is performed (for example, the number of HARQ process=1).

iii) The base station sends a first downlink grant, and a second downlink grant transmitted before transmitting the corresponding first PDSCH may schedule a second PDSCH transmission only in the same subband as the subband for transmission of the first PDSCH.

The LC device may determine the subframe position based on the subband to be used for receiving the PDSCH. However, when cross-subband scheduling is used, control channels received in different subbands may schedule PDSCHs on the same subband. For example, the base station first transmits a control channel C1 in subband #1, and then transmits a control channel C2 in subband #2. However, it may occur that it is necessary to transmit PDSCHs D1 and D2 on the same subframe. In order to prevent this situation from occurring, control channels transmitted in different subbands may be configured not to be able to schedule data on the same subband.

V-3. Delay Timing (K-th Valid Subframe)

When the LC device receives a control channel (downlink grant) on the subframe #n, it may perform PDSCH reception on the K-th valid subframe (for example, K=2) among the subframes after the subframe #n. In this connection, when cross-subband scheduling is applied, a gap subframe to be newly generated by the LC device to receive the PDSCH may not be included in an invalid subframe.

In case of cross-subband scheduling, even when the base station transmitted the control channel in subband #1, the base station may transmit the corresponding PDSCH in subband #2. In this case, the LC device may determine the position of the subframe to be used to receive the PDSCH based on the subband used to receive the control channel. However, in this case, a valid subframe exists in the subband #1 used to receive the control channel and, thus it is determined that the PDSCH may be received. However, in the subband #2, the corresponding subframe becomes an invalid subframe. Thus, the LC device may not receive the PDSCH. In this case, the LC device may operate as follows.

The subframe determined to be used for receiving the PDSCH based on the subband #1 used for receiving the downlink grant becomes an invalid subframe in the subband #2 to be used for receiving the actual PDSCH, and thus, the PDSCH may not be received. In this case, the LC device may drop the reception of the corresponding PDSCH and not perform the reception of the corresponding PDSCH.

Alternatively, when the control channel is received in subband #1 and the corresponding PDSCH is received in subband #2, the LC device determines the position of the subframe to be used to receive the PDSCH based on subband #2 to be used to receive the PDSCH.

Figure 25A:
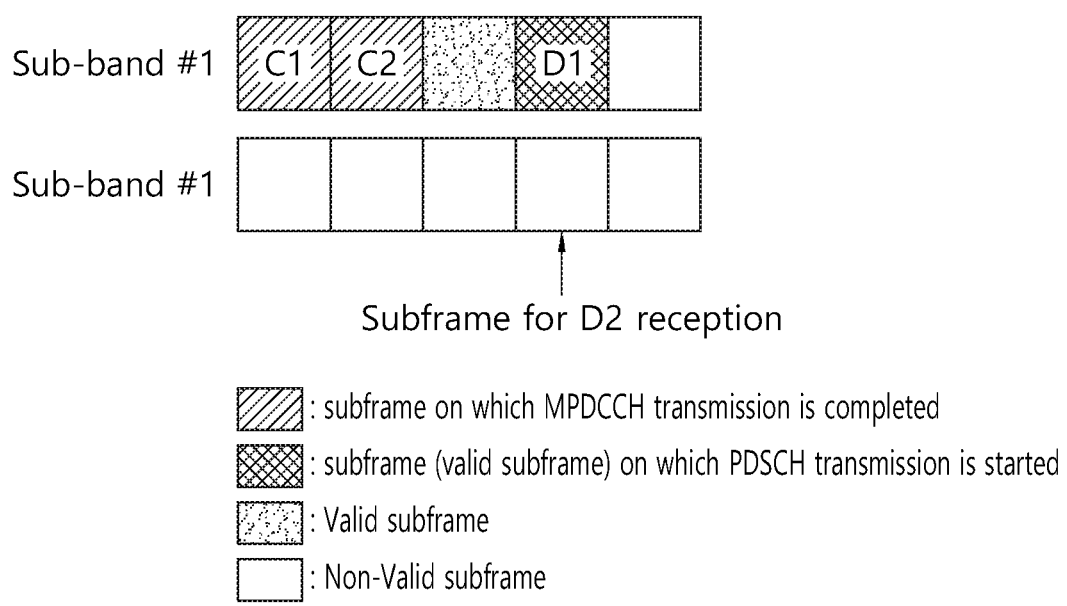
FIGS. 25A and 25B show an example of receiving a PDSCH on a K-th valid subframe.
Figure 25B:
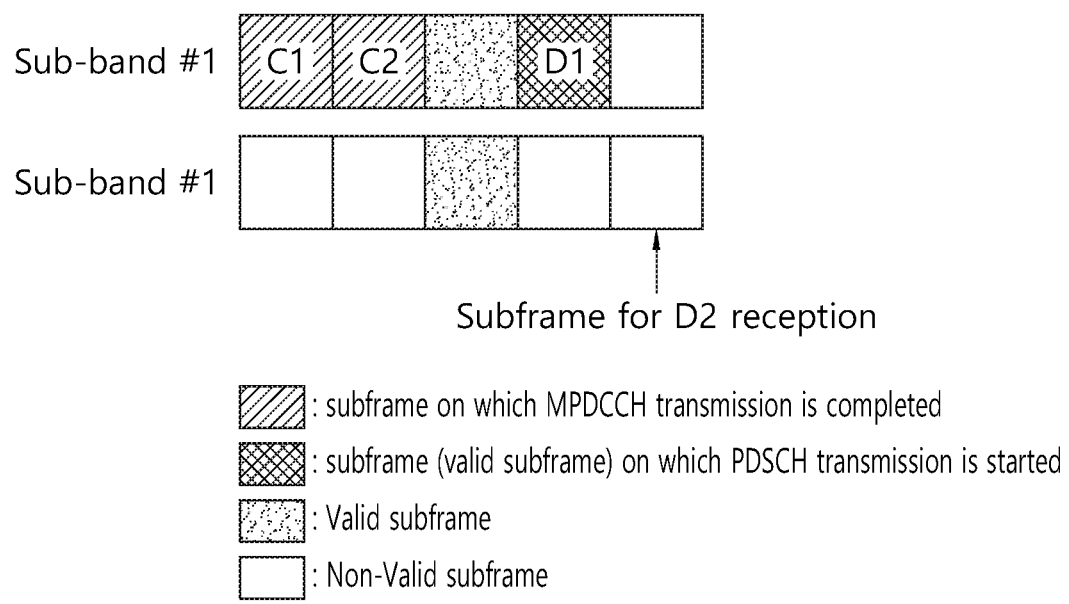

FIGS. 25A and 25B show an example of receiving a PDSCH on the K-th valid subframe.

When the LC device determines an invalid subframe based on a subband to be used for receiving a data channel (that is, determines a subband to be used for receiving a PDSCH), the subframes to be used for receiving the PDSCHs as scheduled by DL grants C1 and C2 received on different subframes respectively may overlap each other, as shown in FIG. 25A. Alternatively, as shown in FIG. 25B, two downlink grants C1 and C2 received on different subframes may schedule PDSCHs in different subbands on two consecutive subframes. In this case, a gap-subframe (or guard subframe) for switching the subband cannot be generated. In such a case, the operation of the LC device, or a method for preventing such a case, may be as follows.

i) The LC device prioritizes reception of the first PDSCH (for example, data channel D1) as scheduled first, and receives the data channel D1, and drops the reception of the second PDSCH (for example, data channel D2). Thus, it may not perform reception of the data channel D2. Alternatively, the LC device prioritizes reception of the most recently scheduled PDSCH (for example, the data channel D2), and drops reception of the first PDSCH (for example, data channel D1), and performs the subband switching using, as a gap subframe, the previous subframe to the subframe used to receive the data channel D2, thereby performing reception of the data channel D2.

ii) The base station sends a downlink grant, and, then, the next downlink grant may not be transmitted by the base station until transmission of the corresponding PDSCH is performed (for example, the number of HARQ process=1).

iii) The base station sends a first downlink grant, and a second downlink grant transmitted before transmitting the corresponding first PDSCH (for example, D1) may schedule a second PDSCH transmission in the same subband as the subband for transmission of the first PDSCH.

Figure 26A:
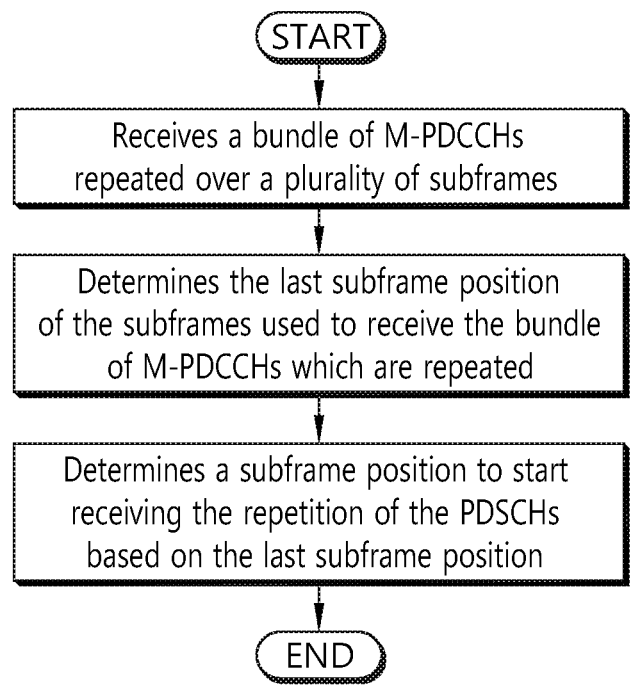
FIG. 26A is a flowchart illustrating a method for starting reception of a PDSCH on a K-th valid subframe.

FIG. 26A is a flowchart illustrating a method for starting reception of a PDSCH on a K-th valid subframe.

First, when a coverage enhancement (CE) is configured for an LC device, the LC device receives a bundle of repetitive M-PDCCHs over a plurality of subframes.

The LC device determines the last subframe position of the subframes used to receive the bundle of repetitive M-PDCCHs.

Further, the LC device determines a subframe position to be used to start receiving the repetition of the PDSCHs based on the last subframe position.

In this connection, when the last subframe is referred to as subframe n, reception of the repetition of the PDSCHs may be started on the n+K-th valid subframe. In other words, reception of the transmission repetition of the PDSCHs may be started on the K-th valid subframe among the subframes following the subframe n.

In this connection, the valid subframe is as described in the Section I. The K may be greater than or equal to 2, as described above.

As described above, this approach may be applied to the transmission of the PUSCH. This will be described with reference to FIG. 26B.

Figure 26B:
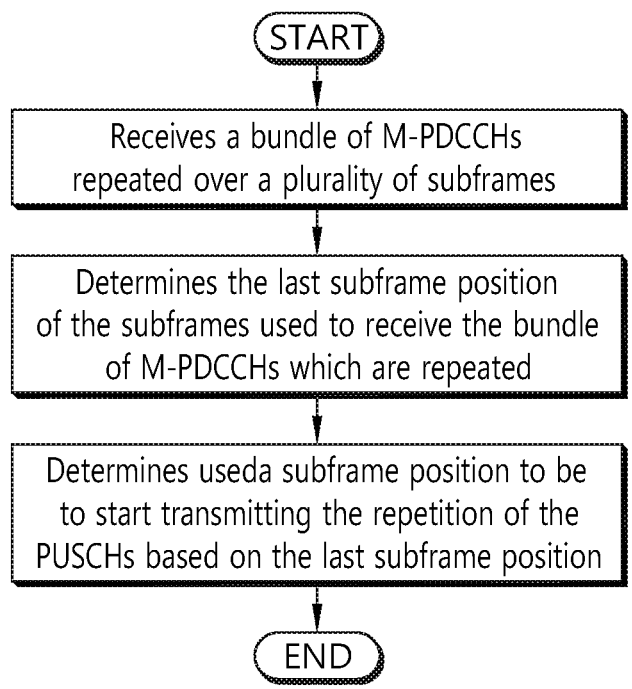
FIG. 26B is a flowchart illustrating a method for starting transmission of a PUSCH on a K-th valid subframe.

FIG. 26B is a flowchart illustrating a method for starting transmission of a PUSCH on a K-th valid subframe.

First, when a coverage enhancement (CE) is configured for an LC device, the LC device receives a bundle of repetitive M-PDCCHs over a plurality of subframes.

The LC device determines the last subframe position of the subframes used to receive the bundle of repetitive M-PDCCHs.

Further, the LC device determines a subframe position to be used to start the repetitive transmission of the PUSCHs based on the last subframe position. In this connection, the subframe position to be used to start the repetitive transmission of the PUSCHs may be determined from valid subframes following the last subframe. For example, the subframe position to be used to start the repetitive transmission of the PUSCHs may be determined as a K-th valid subframe following the last subframe. In this connection, when the last subframe is referred to as subframe n, transmission of the repetition of the PUSCHs may be started on the n+K-th valid subframe. In other words, transmission of the repetition of the PUSCHs may be started on the K-th valid subframe among the subframes following the subframe n. In this connection, the valid subframe is as described in the Section I. For example, the K may be greater than or equal to 4, as described above in the section "1-4. PUSCH timing".

VI. Sixth Embodiment of the Present Disclosure: TDD Timing

VI-1. Timing Between M-PDCCH and PDSCH

When cross-subframe scheduling is applied in TDD environment, and when the M-PDCCH is received on subframe #n, the LC device may perform PDSCH reception on the first valid subframe among the subframes after the subframe #n+K (for example, K=2). However, in this case, two M-PDCCHs received on different subframes may schedule PDSCH on the same downlink subframe (or special subframe). Thus, there may be a downlink subframe (or subframe) on which no PDSCH is received. For example, in the case of U/D configuration 0, M-PDCCHs should be received on subframes #0 and #1, respectively, and all of corresponding PDSCHs should be received on subframe #5. This may cause overlapping problem. Likewise, M-PDCCHs should be received on subframes #5 and #6, respectively, and the corresponding two PDSCHs all should be received on subframe #0. Therefore, superposition problem may occur. In this case, subframes #1 and #6 are not used for transmission of the PDSCH.

In order to prevent reception of the PDSCH only on some subframes as described above, the applicants suggest that a $K_n$ value for a subframe used for receiving an M-PDCCH (DL grant) is determined according to the U/D configuration, as shown in Table 6 and Table 7 below. In this connection, when M-PDCCH is received on subframe #n, the corresponding PDSCH may be received on subframe #n+$K_n$. As in the examples of Table 6 and Table 7, the subframe difference (K) between the subframe used for receiving the downlink grant and the subframe for receiving the corresponding PDSCH is at least 1 or 2. Accordingly, a subframe for reception of the PDSCH scheduled by a downlink grant received on each downlink subframe (or special subframe) may be configured to be uniformly positioned in the downlink subframe (and the special subframe). Table 6 shows the case where the minimum value of $K_n$ is 2, and Table 7 shows the case where the minimum value of $K_n$ is 1.

TABLE 6

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | — | — | — | 5 | 5 | — | — | — |
| 1 | 4 | 4 | — | — | 2 | 4 | 4 | — | — | 2 |
| 2 | 3 | 3 | — | 2 | 2 | 3 | 3 | — | 2 | 2 |
| 3 | 5 | 5 | — | — | — | 2 | 2 | 2 | 2 | 2 |
| 4 | 4 | 4 | — | — | 2 | 2 | 2 | 2 | 2 | 2 |
| 5 | 3 | 3 | — | 2 | 2 | 2 | 2 | 2 | 2 | 2 |
| 6 | 5 | 5 | — | — | — | 4 | 4 | — | — | 2 |

TABLE 7

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 5 | 5 | — | — | — | 5 | 5 | — | — | — |
| 1 | 1 | 3 | | | 1 | 1 | 3 | | | 1 |
| 2 | 1 | 3 | 1 | 1 | 1 | 2 | | | 1 | 1 |
| 3 | 1 | 4 | | | | 1 | 1 | 1 | 1 | 1 |
| 4 | 1 | 3 | | | 1 | 1 | 1 | 1 | 1 | 1 |
| 5 | 1 | 2 | 1 | 1 | 1 | 1 | 1 | 1 | 1 | 1 |
| 6 | 1 | 4 | | | | 1 | 3 | | | 1 |

On the other hand, when the special subframe cannot be used to receive the M-PDCCH and the PDSCH (for example, DwPTS length<=3 OFDM symbols), a subframe for reception of the PDSCH scheduled by a downlink grant except for the special subframe may be configured to be uniformly positioned in the downlink subframe. Table 8 shows the case where the minimum value of $K_n$ is 2, and Table 9 shows the case where the minimum value of $K_n$ is 1.

TABLE 8

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 5 | | | | | 5 | | | | |
| 1 | 5 | | | | 5 | 5 | | | | 5 |
| 2 | 4 | | 2 | 4 | 4 | | | | 2 | 4 |
| 3 | 6 | | | | | | 2 | 2 | 2 | 6 |
| 4 | 5 | | | | 2 | 2 | 2 | 2 | 2 | 5 |
| 5 | 4 | | | 2 | 2 | 2 | 2 | 2 | 2 | 4 |
| 6 | 9 | | | | | 5 | | | | 6 |

TABLE 9

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 5 | | | | | 5 | | | | |
| 1 | 4 | | | 1 | 4 | | | | | 1 |
| 2 | 3 | | 1 | 1 | 3 | | | | 1 | 1 |
| 3 | 5 | | | | 1 | 1 | 1 | 1 | 1 | 1 |
| 4 | 4 | | | 1 | 1 | 1 | 1 | 1 | 1 | 1 |
| 5 | 3 | | 1 | 1 | 1 | 1 | 1 | 1 | 1 | 1 |
| 6 | 5 | | | | 4 | | | | | 1 |

When a valid subframe as described in the previous section I includes only portions of the entire downlink subframe and the special subframe, and when the downlink grant is received on subframe #n, PDSCH may be received on the K-th (K=1 or 2) valid subframe among the subframes after subframe #n+1.

VI-2. Timing Between M-PDCCH and PUSCH

When PUSCH is scheduled via cross-subframe scheduling in TDD environment, and when the M-PDCCH is received on subframe #n, the LC device may perform PUSCH transmission on the first valid subframe among the subframes after the subframe #n+K (for example, K=4 or 5). In order to prevent transmission of the PUSCH only on some subframes, the applicants suggest that a $K_n$ value for a subframe used for transmitting an M-PDCCH (UL grant) is determined according to the U/D configuration, as shown in Table 10 and Table 11 below. In this connection, when the M-PDCCH used for scheduling the PUSCH is received on the subframe #n, the PUSCH may be transmitted on the subframe #n+$K_n$. When the subframe difference (K) between the subframe used for transmission of the uplink grant and the subframe used for transmission of the corresponding PUSCH is at least 4 or 5 as in the examples of table 10 and table 11, a subframe used for transmission of the PUSCH scheduled by the uplink grant received on each downlink subframe (or special subframe) may be configured to be evenly positioned between the uplink subframes.

On the other hand, when the DwPTS of the special subframe is short or the special subframe is used as a gap subframe for subband switching, the base station may be unable to transmit the M-PDCCH on the special subframe. Accordingly, as in Table 12 and Table 13, the value of $K_n$ may be determined so that an M-PDCCH (uplink grant) is transmitted without using a special subframe. That is, when the number of uplink subframes is equal to or smaller than the number of downlink subframes, the uplink grant may be transmitted only on the downlink subframe except the special subframe. Accordingly, the value of $K_n$ may be determined in consideration of this.

In the following tables, a subframe for which the $K_n$ value is not marked (a subframe on which the M-PDCCH is not repeatedly transmitted by the LC device for which no coverage enhancement is required) is a subframe on which the uplink grant cannot be transmitted.

Table 10 and Table 12 show the case where the minimum value of $K_n$ is 4, and Table 11 and Table 13 are cases where the minimum value of $K_n$ is 5.

TABLE 10

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | 4 | 6 | | | |
| 1 | | | 6 | | 4 | | 6 | | | 4 |
| 2 | | | | 4 | | | | 4 | | |
| 3 | 4 | | | | | | | 4 | 4 | |
| 4 | | | | | | | | 4 | 4 | |
| 5 | | | | | | | | 4 | | |
| 6 | | 7 | 7 | | | | 7 | 7 | | 5 |

TABLE 11

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | | 7 | 7 | | | | 7 | 7 | | |
| 1 | | 7 | 7 | | | | 7 | 7 | | |
| 2 | | | | 6 | | | | 6 | | |
| 3 | | | | | | | | 5 | 5 | 5 |
| 4 | | | | | | | | 5 | 5 | |
| 5 | | | | | | | | 5 | | |
| 6 | | 7 | 7 | | | | 7 | 7 | | 5 |

TABLE 12

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | 4 | 6 | | | |
| 1 | | 7 | | | 4 | 7 | | | | 4 |
| 2 | | | | 4 | | | | 4 | | |
| 3 | 4 | | | | | | | 4 | 4 | |
| 4 | | | | | | | | 4 | 4 | |
| 5 | | | | | | | | 4 | | |
| 6 | | 7 | 7 | | | | 7 | 7 | | 5 |

TABLE 13

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | | 7 | 7 | | | | 7 | 7 | | |
| 1 | | 8 | | | 8 | 8 | | | | 8 |
| 2 | | 7 | | | | | | 7 | | |
| 3 | | | | | | | | 5 | 5 | 5 |
| 4 | | | | | | | | 5 | 5 | |
| 5 | | | | | | | | 5 | | |
| 6 | | 7 | 7 | | | | 7 | 7 | | 5 |

On the other hand, when the uplink subframe to be used for transmission of the PUSCH is an invalid subframe (for example, a gap subframe for subband switching), the LC device may drop the PUSCH transmission and not perform transmission thereof.

In order to prevent the uplink subframe to be used for transmission of the PUSCH from being the invalid subframe, the present inventors propose that the gap subframe for subband switching always exists only on the following subframe.

first option: downlink/special subframe not used for uplink transmission second option: special subframe not used for uplink transmission Further, in order to prevent a downlink/special subframe to be used for receiving the uplink grant from becoming an invalid subframe, and thus to allow the uplink grant transmission, the present inventors propose that the gap subframe for subband switching always exists only on the following subframe.

first option: downlink/special subframe not used for uplink grant transmission second option: downlink/special subframe on which uplink grant transmission is disallowed third option: special subframe.

In order to prevent the generation of gap subframes for subband switching between consecutive uplink subframes, the present inventors propose that PUSCHs scheduled on the continuous uplink subframe are all transmitted using the same subband.

VI-3. Timing Between PDSCH and PUCCH

When in TDD environment, the PDSCH is transmitted on subframe #n, the LC device may perform PUCCH (A/N) transmission on the first valid subframe among the subframes after the subframe #n+K (for example, K=4 or 5). In order to prevent transmission of the PUCCH only on some subframes, the applicants suggest that a $K_n$ value for a subframe used for transmitting a PDSCH is determined according to the U/D configuration, as shown in Table 14 and Table 15 below. In this connection, when the PDSCH is received on the subframe #n, the PUCCH (A/N) may be transmitted on the subframe #n+$K_n$. The applicants suggest that a $K_n$ value is determined such that the PUCCHs for the PDSCH received on each downlink/special subframe are evenly distributed in uplink subframes, as examples of table 14 and table 15. That is, when the number of downlink/special subframes is D within 10 msec, the value of $K_n$ may be set such that the number of downlink subframes configured to transmit PUCCH (A/N) information on the same uplink subframe is as follows:

[D/(10−D)], or $$[D/(10-DA]. \quad \text{[Equation 1]}$$

Table 14 shows the case where the minimum value of $K_n$ is 4, and Table 15 shows the case where the minimum value of $K_n$ is 5.

TABLE 14

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | 4 | 6 | — | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 6 | 5 | 4 | |
| 5 | 12 | 11 | — | 9 | 8 | 7 | 6 | 5 | 4 | 13 |
| 6 | 7 | 7 | — | — | 7 | 7 | — | — | 5 | |

TABLE 15

| UL-DL Configuration | $K_n$ | | | | | | | | | |
|---|---|---|---|---|---|---|---|---|---|---|
| | 0 | 1 | 2 | 3 | 4 | 5 | 6 | 7 | 8 | 9 |
| 0 | 7 | 7 | — | — | 7 | 7 | — | — | — | — |
| 1 | 7 | 7 | — | — | 8 | 7 | 7 | — | — | 8 |
| 2 | 7 | 6 | — | 9 | 8 | 7 | 6 | — | 9 | 8 |

TABLE 15-continued

| UL-DL Configuration | 0 | 1 | 2 | 3 | 4 | 5 | 6 | 7 | 8 | 9 |
|---|---|---|---|---|---|---|---|---|---|---|
| 3 | 12 | 11 | — | — | — | 7 | 7 | 6 | 6 | 5 |
| 4 | 12 | 11 | — | — | 8 | 8 | 7 | 6 | 5 | 13 |
| 5 | 12 | 11 | — | 9 | 8 | 7 | 6 | 5 | 14 | 13 |
| 6 | 7 | 7 | — | — | — | 7 | 7 | — | — | 5 |

VI-4. Timing Between PUSCH and PHICH

When transmission of PUSCH is performed on subframe #n in TDD environment, the LC device may receive the PHICH including the A/N on the first valid subframe among the subframes after the subframe #n+K (for example, K=4 or 5). In this connection, in order to prevent reception of PHICH including A/N only on some subframes, the present inventors propose that the $K_n$ value for the subframe for transmission of the PUSCH is configured according to the U/D configuration, as shown in table 16 or table 17. In this connection, when PUSCH is transmitted on subframe #n, PHICH including A/N may be received on subframe #n+$K_n$. The value of $K_n$ may be determined so that the PHICH (A/N) for the PUSCH transmitted on each uplink subframe is evenly distributed in the downlink subframes as shown in Table 16 to Table 19.

On the other hand, when the length of the DwPTS of the special subframe is short or the special subframe is used as a gap subframe for subband switching as for an LC device that does not receive a PHICH for a legacy UE, It may be difficult for the LC device to receive A/N on the special subframe. Therefore, as in Table 18 and Table 19, the value of $K_n$ may be set so that the PHICH (A/N) is transmitted without using the special subframe. That is, if the number of uplink subframes is equal to or smaller than the number of downlink subframes, the PHICH (A/N) may be transmitted only on the downlink subframe except the special subframe. Thus, It is also possible to set the value of $K_n$ in consideration of this.

Table 16 and Table 18 show the case where the minimum value of $K_n$ is 4, and Table 17 and Table 19 are cases where the minimum value of $K_n$ is 5.

TABLE 16

| UL-DL Configuration | 0 | 1 | 2 | 3 | 4 | 5 | 6 | 7 | 8 | 9 |
|---|---|---|---|---|---|---|---|---|---|---|
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

TABLE 17

| UL-DL Configuration | 0 | 1 | 2 | 3 | 4 | 5 | 6 | 7 | 8 | 9 |
|---|---|---|---|---|---|---|---|---|---|---|
| 0 | | | 8 | 7 | 7 | | | 8 | 7 | 7 |
| 1 | | | 7 | 7 | | | | 7 | 7 | |
| 2 | | | 6 | | | | | 6 | | |
| 3 | | | 6 | 6 | 6 | | | | | |
| 4 | | | 6 | 6 | | | | | | |
| 5 | | 6 | | | | | | | | |
| 6 | | | 7 | 7 | 7 | | | | 8 | 8 |

TABLE 18

| UL-DL Configuration | 0 | 1 | 2 | 3 | 4 | 5 | 6 | 7 | 8 | 9 |
|---|---|---|---|---|---|---|---|---|---|---|
| 0 | | | 4 | 7 | 6 | | | 4 | 7 | 6 |
| 1 | | | 7 | 7 | | | | 7 | 7 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 7 | 7 | 7 | | | | 8 | 8 |

TABLE 19

| UL-DL Configuration | 0 | 1 | 2 | 3 | 4 | 5 | 6 | 7 | 8 | 9 |
|---|---|---|---|---|---|---|---|---|---|---|
| 0 | | | 8 | 8 | 6 | | | 8 | 8 | 6 |
| 1 | | | 7 | 7 | | | | 7 | 7 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 7 | 8 | 6 | | | | 8 | 8 |

On the other hand, if the downlink subframe to be used for receiving the PHICH is an invalid subframe (for example, a gap subframe for subband switching), the LC device may assume that the PHICH (A/N) is not transmitted by the base station. Assuming that PHICH (A/N) is not transmitted, the LC device may operate as follows:

first option: The device assumes that transmission of PUSCH was successful and ACK was received.

second option: The device assumes that the transmission of the PUSCH fails and the NACK is received.

third option: The device assumes that reception of the PHICH has failed and follows the operation defined when the reception of the PHICH fails.

fourth option: If the device does not expect to receive the PHICH (A/N) for another PUSCH transmitted on the next downlink subframe to the subframe to be used for receiving PHICH (A/N), the LC device may assume that the PHICH (A/N) is transmitted by the base station on the corresponding subframe. When expecting reception of PHICH (A/N) for another PUSCH transmitted on the next downlink subframe to a subframe to be used for receiving PHICH (A/N), the device may follow the first to third options.

The above-described approaches may be equally applied to a case when the ACK/NACK information for the PUSCH is received using another channel (for example, EPHICH (Enhanced PHICH), M-PDCCH, M-PDCCH), or a case when M-PDCCH for scheduling retransmission for the PUSCH transmitted by the LC device is received.

The embodiments of the present invention as described above may be implemented using various means. For example, the embodiments of the invention may be implemented by hardware, firmware, software or a combination thereof. More specifically, descriptions thereof will be made with reference to the drawing.

Figure 27:
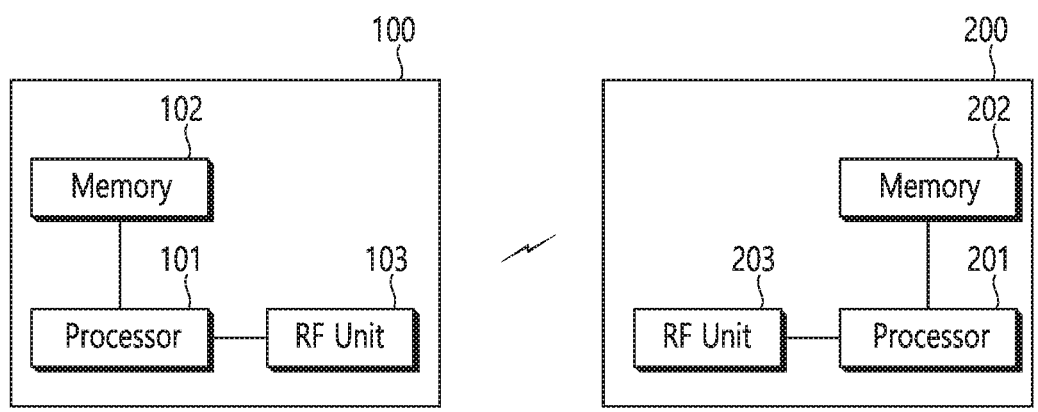
FIG. 27 is a block diagram illustrating a wireless communication system in which embodiments of the present disclosure are implemented.

FIG. 27 is a block diagram illustrating a wireless communication system configured to implement the embodiments of the present disclosure.

The base station 200 includes a processor 201, a memory 202, and a radio frequency (RF) unit 203. The memory 202 is connected to the processor 201 and stores various information for driving the processor 201. The RF unit 203 is connected to the processor 201 to transmit and/or receive wireless signals. The processor 201 implements the proposed functions, processes and/or methods. In the above-described embodiments, the operation of the base station may be implemented by the processor 201.

The LC device 100 includes a processor 101, a memory 102 and an RF unit 103. The memory 102 is connected to the processor 101 and stores various information for driving the processor 101. The RF unit 103 is connected to the processor 101 to transmit and/or receive wireless signals. The processor 101 implements the proposed functions, processes and/or methods.

The processor may include an application-specific integrated circuit (ASIC), other chipset, logic circuitry and/or data processing unit. The memory may include read-only memory (ROM), random access memory (RAM) and flash memory, memory cards, storage media, and/or other storage devices. The RF unit may include a baseband circuit for processing a radio signal. When the embodiments are implemented in software, the above-described techniques may be implemented using modules (processes, functions, etc.) that perform the functions described above. The modules may be stored in the memory and may be executed by the processor. The memory may be internal or external to the processor, and may be coupled to the processor by various well known means.

Although the method is described on the basis of a flowchart as a series of steps or blocks, the present invention is not limited to the order of the steps, and some steps may occur in different orders or simultaneously. It will also be appreciated by those skilled in the art that the steps shown in the flowchart are not exclusive and that other steps may be included or that one or more steps in the flowchart may be deleted without affecting the scope of the invention.

What is claimed is:

1. A method for receiving a physical downlink shared channel (PDSCH), the method performed by a device and comprising:
    if the device is configured for a coverage enhancement, receiving repetitions of a first downlink control channel;
    determining a plurality of downlink subframes for receiving repetitions of a PDSCH, based on the received repetitions of the first downlink control channel;
    wherein if a number of the repetitions of the PDSCH is N, the determined plurality of downlink subframes include N valid downlink subframes,
    dropping a reception of any PDSCH, among the repetitions of the PDSCH, on a multimedia broadcast and multicast single frequency network (MBSFN) subframe if the determined plurality of downlink subframes includes the MBSFN subframe and if the PDSCH uses a transmission scheme based on a cell-specific reference signal (CRS);
    counting a number of downlink subframes including the MBSFN subframe on which PDSCH reception is dropped; and
    performing a reception of the repetitions of the PDSCH via the counted number of downlink subframes,
    wherein the first downlink control channel is received within a first narrowband including six (6) physical resource blocks (PRBs),
    wherein the PDSCH is received within a second narrowband including six PRBs,
    wherein the determining further comprises:
    determining that there is no second downlink control channel which overlaps with at one subframe among the plurality of downlink subframes for receiving repetitions of the PDSCH if the second downlink control channel is located at a different narrowband from the second narrowband.

2. The method of claim 1, wherein the repetitions of the first downlink control channel are received over valid subframes except for a time division duplex (TDD) special subframe for switching between a TDD downlink subframe and a TDD uplink subframe.

3. The method of claim 1, further comprising:
    receiving a SIB including information on valid downlink subframe.

4. The method of claim 1, further comprising:
    counting a total number of downlink subframes including other downlink subframes being not used for receiving the repetitions of the PDSCH.

5. The method of claim 2, wherein the TDD special subframe is not configured as a valid subframe.

6. The method of claim 1, further comprising:
    not receiving the PDSCH on a subframe, which is not configured as a valid subframe.

7. A device for receiving a physical downlink shared channel (PDSCH), comprising:
    a transceiver configured to receive repetitions of a first downlink control channel if the device is configured for a coverage enhancement; and
    a processor configured to:
        determine a plurality of downlink subframes for receiving repetitions of a PDSCH, based on the received repetitions of the first downlink control channel,
        wherein if a number of the repetitions of the PDSCH is N, the determined plurality of downlink subframes include N valid downlink subframes,
        drop a reception of any PDSCH, among the repetitions of the PDSCH, on a multimedia broadcast and multicast single frequency network (MBSFN) subframe if the determined plurality of downlink subframes includes the MBSFN subframe and if the PDSCH uses a transmission scheme based on a cell-specific reference signal (CRS),
        count a number of downlink subframes including the MBSFN subframe on which PDSCH reception is dropped, and
        perform a reception of the repetitions of the PDSCH via the counted number of downlink subframes,
    wherein the first downlink control channel is received within a first narrowband including six (6) physical resource blocks (PRBs),
    wherein the PDSCH is received within a second narrowband including six PRBs,
    wherein the processor is further configured to determine that there is no second downlink control channel which overlaps with at one subframe among the plurality of downlink subframes for receiving repetitions of the PDSCH if the second downlink control channel is located at a different narrowband from the second narrowband.

8. The device of claim 7, wherein the repetitions of the first downlink control channel are received over valid subframes except for a TDD special subframe for switching between a time division duplex (TDD) downlink subframe and a TDD uplink subframe.

9. The device of claim 7, wherein the transceiver further receives a SIB including information on valid downlink subframe.

10. The device of claim 7, wherein in order to receive the repetitions of the PDSCH, the processor is further configured to:
- counts a total number of downlink subframes including other downlink subframes being not used for the reception receiving the repetitions of the PDSCH.

11. The device of claim 8, wherein the TDD special subframe is not configured as a valid subframe.

12. The device of claim 7, wherein the transceiver is further configured to:
- not receive the PDSCH on a subframe, which is not configured as a valid subframe.

* * * * *